United States Patent
Williams et al.

(10) Patent No.: US 7,334,161 B2
(45) Date of Patent: Feb. 19, 2008

(54) BREAKPOINT LOGIC UNIT, DEBUG LOGIC AND BREAKPOINT METHOD FOR A DATA PROCESSING APPARATUS

(75) Inventors: Michael John Williams, Ely (GB); Paul Kimelman, Alamo, CA (US); Jon Andrew Rijk, Cambridge (GB)

(73) Assignee: ARM Limited, Cambridge (GB)

( * ) Notice: Subject to any disclaimer, the term of this patent is extended or adjusted under 35 U.S.C. 154(b) by 558 days.

(21) Appl. No.: 10/835,279

(22) Filed: Apr. 30, 2004

(65) Prior Publication Data

US 2005/0257089 A1 Nov. 17, 2005

(51) Int. Cl.
*G06F 11/00* (2006.01)
(52) U.S. Cl. .......................... 714/34; 714/35
(58) Field of Classification Search .................. 714/34, 714/35
See application file for complete search history.

(56) References Cited

U.S. PATENT DOCUMENTS

| | | | | |
|---|---|---|---|---|
| 5,371,894 | A * | 12/1994 | DiBrino | 714/34 |
| 5,717,851 | A * | 2/1998 | Yishay et al. | 714/25 |
| 5,737,516 | A * | 4/1998 | Circello et al. | 714/38 |
| 5,889,981 | A * | 3/1999 | Betker et al. | 712/227 |
| 6,035,422 | A * | 3/2000 | Hohl et al. | 714/35 |
| 6,134,652 | A * | 10/2000 | Warren | 712/227 |
| 6,205,560 | B1 * | 3/2001 | Hervin et al. | 714/34 |
| 6,425,122 | B1 | 7/2002 | Klingman | |

(Continued)

FOREIGN PATENT DOCUMENTS

EP 0 507 208 10/1992

(Continued)

OTHER PUBLICATIONS

*RCPU RISC Central Processing Unit Reference Manual, Revision 1*, Digital DNA from Motorola, Revised Feb. 1, 1999, pp. 1-552.

*Primary Examiner*—Scott Baderman
*Assistant Examiner*—Paul F. Contino
(74) *Attorney, Agent, or Firm*—Nixon & Vanderhye P.C.

(57) ABSTRACT

The present invention provides a breakpoint logic unit, debug logic and breakpoint method for a data processing apparatus. The breakpoint logic unit comprises a value storage operable to store data indicative of a selected value for an operational characteristic of the data processing apparatus, and comparator logic operable to compare the selected value with a value of the operational characteristic as generated by the data processing apparatus. The comparator logic then generates at least one result signal indicative of a match between that value and the selected value. A control storage is also provided for storing a match control value, such that if the match control value has a first value the comparator logic is operable to set the at least one result signal if a match is detected between the value and the selected value, whilst if the match control value has a second value the comparator logic is operable to set the at least one result signal if a match is not detected between the value and the selected value. Breakpoint generation logic is then operable to enable generation of an associated at least one breakpoint signal if the at least one result signal is set. This has been found to provide a particularly flexible and efficient technique for enabling a variety of breakpoint conditions to be programmed within the breakpoint logic unit.

34 Claims, 11 Drawing Sheets

U.S. PATENT DOCUMENTS

| | | |
|---|---|---|
| 6,477,664 B1 | 11/2002 | Hong |
| 2003/0037225 A1 | 2/2003 | Deng et al. |
| 2005/0229163 A1* | 10/2005 | Bates et al. .................. 717/129 |
| 2006/0041788 A1* | 2/2006 | Brock et al. .................. 714/34 |

FOREIGN PATENT DOCUMENTS

| | | |
|---|---|---|
| WO | WO 81/03078 | 10/1981 |

* cited by examiner

BREAKPOINT LOGIC UNIT, DEBUG LOGIC AND BREAKPOINT METHOD FOR A DATA PROCESSING APPARATUS

BACKGROUND OF THE INVENTION

1. Field of the Invention

The present invention relates to a breakpoint logic unit, debug logic and breakpoint method for a data processing apparatus.

2. Description of the Prior Art

It is known to provide debug logic within a data processing apparatus to enable programs running on the data processing apparatus to be debugged by an external diagnostic system. An example of such a data processing apparatus is the processing system 10 of FIG. 1. The processing system 10 has a central processing unit (CPU) 50 provided therein, which is coupled to a memory system 65 via one or more buses to enable instructions and data to be passed between the CPU 50 and memory 65 as required by the CPU when executing one or more programs (as illustrated schematically by paths 55 and 60).

Debug logic 35 is provided within the processing system 10 for interfacing to an external diagnostic system 20. The debug logic 35 contains registers for use by the diagnostic system 20 for debugging programs running on the CPU 50 of the processing system 10. Features required for debugging include:
1. setting a "breakpoint", such that the program halts execution when it attempts to execute an instruction at a given address;
2. single-stepping through a program, such that the program executes the next instruction to be executed and then halts execution; and
3. the ability to read from and write to the memory 65 and/or registers internal to the CPU 50.

Typically, the diagnostic system 20 will establish a breakpoint by sending a control signal over path 25 to the debug logic 35 to cause a selected address value to be stored within a value register of the debug logic, after which the debug logic 35 will compare that selected address value against the address of an instruction being fetched by the CPU 50, as indicated by the debug control signals 40 passed from the CPU to the debug logic 35. If it is determined that the instruction being fetched by the CPU matches the selected address stored in the value register of the debug logic, the debug logic 35 will then issue a breakpoint signal over path 45 to the CPU 50 to mark the instruction being fetched as being breakpointed. When the processor then attempts to execute that instruction, it instead halts execution and enters a debug state. The diagnostic system 20 can then via the debug logic 35 retrieve over path 30 contents from the CPU's registers and/or memory 65, as well as various other pieces of control information, in order to enable analysis of the current state of the processing system 10 to take place.

Breakpoints are used to solve a variety of problems. One such problem is to allow the user of the diagnostic system 20 to specify "run to here". In such a usage scenario, the user selects a point in the program through the diagnostic system's user interface, and selects a "run to here" command. The diagnostic system then sets a breakpoint at that point by storing the relevant address in a value register of the debug logic, after which the processing system 10 is then set running. When a match is detected by the debug logic, and the breakpoint signal is hence issued, the processor will then stop running when it attempts to execute that instruction, and the diagnostic system will remove the breakpoint. The appearance to the user is that the program ran to a specified point. The user is unlikely to be aware that a breakpoint was used. However, the above approach only solves one class of the "run to" problem. In many other cases, the user may want to run until the processor is in a particular state rather than at a particular point. As an example, when using a system with different privileged modes or different secure states, there may be a requirement to "run until" the processor enters a particular mode or a particular state. There may also be a requirement to be able to combine these mode and state conditions. Whilst it might be possible to build specialised debug hardware aimed at supporting a particular complex breakpointing scenario such as one of those scenarios discussed above, this would be a costly approach, and would lack flexibility.

As discussed earlier, another feature required for debugging is single-stepping through a program. Traditionally, single-stepping is performed in one of two ways. In accordance with a first approach, the diagnostic system 20 is arranged to decode the "next instruction" and calculate which will be the instruction executed after that. Following this analysis, the diagnostic system 20 can then set a breakpoint at the address of that calculated instruction using the above described approach for setting breakpoints. This approach is however limited because it requires the diagnostic system 20 to understand the full behaviour of every instruction that can be executed on the processor 50. This limits the ability of the processing system designer to extend the instruction set with new instructions, because diagnostic systems may not understand these new instructions. It also presumes that the instruction will complete correctly, and hence that no exceptional circumstances will occur.

An alternative approach for single-stepping involves providing within the debug logic hardware a "single-step" control bit that instructs the processor to halt execution as soon as the next instruction completes execution. However, this second method is limited as it only allows simple levels of single-stepping, namely single-stepping to the very next instruction executed. Since this approach will always step to the next instruction that would be executed by the processor, then if an exceptional circumstance occurs the processor will halt at the first instruction of the related exception handler, which is not necessarily the desired behaviour. As another example, where the processing system runs multiple programs, and switches between them on the occurrence of interrupts driven by an external source, this leads to the user not being readily able to debug a single program, as the diagnostic system would "step into" the handlers for the interrupts from the timer system, and it would hence be very difficult to step to the next instruction from the program under test.

It would be desirable to provide an improved breakpoint mechanism which would allow the above described limitations of the prior art to be alleviated.

The "ARM7TDMI" debug logic produced by ARM Limited provided a pair of watchpoint registers and enabled the output of one watchpoint register to be routed as an input to the second watchpoint register in the pair. This structure would allow a breakpoint signal to be issued in the event of there not being a match between the address of an instruction fetched by the processor and a selected instruction address. This could be achieved by arranging the first watchpoint register to generate an output in the event of a match being detected between the fetched instruction address and the selected instruction address, and to use that output signal as an input to the second watchpoint register. The second watchpoint register can then be arranged to generate a match signal on any address, provided that a match signal has not been issued by the first watchpoint register. This match signal from the second comparator can then be used to generate a breakpoint signal, which would hence be set whenever the instruction address of the instruction being fetched did not match the selected instruction address. Whilst this would provide some improved flexibility with regard to single-stepping, it requires the use of a pair of interconnected watchpoint registers, which add significant complexity to the design of the debug logic.

Accordingly, it would be desirable to provide a breakpoint mechanism which would alleviate the limitations of the earlier-described prior art techniques, whilst avoiding any unnecessary increase in complexity of the breakpoint logic unit's design.

SUMMARY OF THE INVENTION

Viewed from a first aspect, the present invention provides a breakpoint logic unit for a data processing apparatus, comprising: a value storage operable to store data indicative of a selected value for an operational characteristic of the data processing apparatus; comparator logic operable to compare said selected value with a value of said operational characteristic as generated by the data processing apparatus and to generate at least one result signal indicative of a match between said value and said selected value; a control storage operable to store a match control value, if the match control value has a first value the comparator logic being operable to set the at least one result signal if a match is detected between said value and said selected value, whilst if the match control value has a second value the comparator logic being operable to set the at least one result signal if a match is not detected between said value and said selected value; and breakpoint generation logic operable to enable generation of an associated at least one breakpoint signal if the at least one result signal is set.

In accordance with the present invention, a match control value is provided within the control storage of the breakpoint logic unit that, dependent on its value, inverts the sense of the comparison performed by the comparator logic. In particular, the comparator logic is arranged to generate at least one result signal indicative of a match between a selected value of an operational characteristic and a value of that operational characteristic as generated by the data processing apparatus. If the match control value has a first value the comparator logic is operable to set the at least one result signal if a match is detected between the values, whilst if the match control value has a second value, the comparator logic is operable to set the at least one result signal if a match is not detected between the values. For each result signal that is set, breakpoint generation logic then enables generation of an associated breakpoint signal.

The use of this match control value provides a great deal of flexibility with regard to the generation of breakpoint signals. As an example, if the operational characteristic is an address, this match control value enables single-stepping to be readily implemented. In order to single-step, the address of the instruction being "stepped from" is stored in the value storage as the selected value, and the match control value is set to have its second value. When the data processing apparatus is then allowed to run, the address of the first instruction will be issued by the processor. As the address of this instruction matches that in the value storage, the result signal will not be set, and accordingly generation of a breakpoint signal is not possible. However, when the processor then fetches subsequent instructions, since the addresses of each of these instructions do not match the address in the value storage, this will cause the result signal to be set, thus enabling generation of a breakpoint signal. Therefore, assuming that no other conditions are specified that would prevent the breakpoint generation logic from generating a breakpoint signal, then a breakpoint signal will be issued to the processor, which will cause the processor to stop execution on the next instruction to be executed after the instruction being stepped from is executed.

As another example of the flexibility of the approach of the present invention, if the operational characteristic is a process identifier indicating a process associated with the instruction fetch, then a selected process identifier value can be stored in the value storage and compared by the comparator logic with process identifiers issued by the data processing apparatus. If the match control value has a first value, then the breakpoint generation logic will be enabled to generate breakpoint signals if the comparator detects a match between the process identifier issued by the data processing apparatus and the selected process identifier value stored in the value storage, whereas if the match control value takes its second value, then the breakpoint generation logic will be enabled to generate breakpoint signals if the comparator logic does not detect a match between the process identifier issued by the data processing apparatus and the selected process identifier value stored in the value storage. According to this latter approach, the breakpoint logic unit can be arranged to allow the processor to run until it is not running the specified process as indicated by the selected process identifier value stored in the value storage.

The comparator logic is arranged to generate at least one result signal. In one embodiment, only one instruction is fetched at a time, and in that instance the at least one result signal comprises a single result signal, and the breakpoint generation logic is operable to enable generation of an associated single breakpoint signal if the result signal is set.

For each instruction there will be defined an associated smallest addressable unit of an instruction (also referred to herein as the instruction width). This is typically fixed for a particular instruction set. In one embodiment, all instructions may be of the same width. However, in an alternative embodiment, instructions from multiple instruction sets may have different widths. In such situations, if the processor still fetches one instruction at a time, it is still possible to arrange for the breakpoint logic unit to produce a single result signal, provided that information about the width of the instructions is input to the comparator logic.

In an alternative embodiment, the data processing apparatus may use a plurality of different instruction sets, each of which has an associated width. For example, for the ARM instruction set this width is 4 bytes, for the Thumb instruction set this width is 2 bytes, and for the Java Virtual Machine instruction set this width is 1 byte. Within any particular instruction set, an instruction may consist of exactly one of the smallest addressable units, or alternatively the instruction set may comprise variable length instructions specified by one or more of the smallest addressable units for that instruction set. In embodiments where different instruction sets may be used by the processor, an instruction fetch may involve fetching a predetermined number of bytes starting from a particular instruction address. The number of instructions contained within those predetermined number of bytes may vary. In such embodiments, the at least one result signal comprises a plurality of result signals, and for each said result signal the breakpoint generation logic is operable to enable generation of an associated breakpoint signal if that result signal is set. In this embodiment, the use of the multiple result signals enables the generation of a corresponding multiple number of breakpoint signals, which can then be analysed by the processor based on an understanding of how many instructions are represented by the predetermined number of bytes fetched starting from the specified instruction address.

The match control signal can take a variety of forms. However, in one embodiment, the match control signal is a mismatch control signal, such that if the mismatch control signal is not set the comparator logic is operable to set the at least one result signal if a match is detected between said value and said selected value, whilst if the mismatch control signal is set the comparator logic is operable to set the at least one result signal if a match is not detected between said value and said selected value. Hence, by setting the mismatch control signal, the breakpoint logic unit will invert the sense of the comparison performed by the comparator logic.

In one embodiment, for each said result signal, the breakpoint generation logic is operable to generate the associated breakpoint signal if that result signal is set. Hence, in this embodiment, the only factor controlling the issuance of the associated breakpoint signal is the setting of the relevant result signal.

However, in an alternative embodiment, said control storage is operable to store one or more further control values identifying one or more required conditions to be met in order for the at least one breakpoint signal to be generated, and the breakpoint logic unit further comprises: breakpoint conditioning logic operable to receive control signals generated by the data processing apparatus and associated with the value of said operational characteristic and to determine based on the received control signals whether said one or more required conditions are met; the breakpoint generation logic being operable, for each said result signal, to generate the associated breakpoint signal if both that result signal is set and said one or more required conditions are met. Hence, by this approach, the results of the comparison can be combined with other conditions in order to control the generation of the breakpoint signal(s), thus providing a great deal of flexibility as to the sequence of events that can give rise to the issuance of a breakpoint signal.

In one embodiment, said one or more further control values comprise a mode control value indicating a required mode of operation from which the value of said operational characteristic was generated in order for the at least one breakpoint signal to be generated. As an example of the use of this extra control value, exceptions generated in a non-privileged mode of operation are typically handled in a privileged mode of operation, and once handled the exception handler returns to a non-privileged mode of operation in which the non-privileged program is run. By setting the mode control value to specify the non-privileged mode, and by setting the match control value to its second value, a diagnostic system using the breakpoint logic unit can cause an associated processor to halt when the next non-privileged instruction is executed. Hence, if an exception is taken, the processor will enter a privileged mode and thus the breakpoint generation logic will not generate the breakpoint signal(s), allowing the exception handler to run. On return from the exception handler, the processor returns to the non-privileged mode, and hence the breakpoint generation logic can generate the breakpoint signal(s). The effect is hence to step over the handler.

As another example of the further control values that can be stored within the control storage, one of the control values may comprise a domain control value (also referred to as a security domain control value) indicating a required domain from which the value of said operational characteristic was generated in order for the at least one breakpoint signal to be generated. As an example, a processor may be able to execute in a secure domain (also referred to herein as a secure state) or a non-secure domain (also referred to herein as a non-secure state). By appropriate setting of the domain control value and the match control value, a diagnostic system can cause the processor to halt when the next secure/non-secure instruction is executed. This can for example be done regardless of the address of the secure/non-secure instruction.

It will be appreciated that the operational characteristic compared by the comparator logic may take a variety of forms. However, in one embodiment, the operational characteristic is a characteristic associated with an instruction fetch performed by the data processing apparatus. More particularly, in one embodiment, the operational characteristic is an indication of an instruction fetch address.

In such embodiments, said one or more further control values may comprise an indication of one or more required processes from which the value of said operational characteristic was generated in order for the at least one breakpoint signal to be generated, the breakpoint conditioning logic being operable to receive one or more process match signals from one or more process identifier comparators indicative of whether the value of said operational characteristic was generated from one of said one or more required processes. By appropriate setting of this further control value, and by setting the match control value to its second value, a single-step process can be arranged to step only to the next instruction of the current process, since the breakpoint signal will only be issued if the process identifier matches that of the required process as indicated by this further control value.

In one embodiment where the operational characteristic is an indication of an instruction fetch address, and a single result signal is generated by the comparator logic: the instructions employed in the data processing apparatus are of variable width; said control storage is operable to store a mask comprising a number of bits; the comparator logic includes mask logic operable to receive a width control signal indicative of the width of the instruction the subject of the instruction fetch, and to select one or more bits of the mask dependent on the value of the width control signal and a predetermined number of least significant bits of the instruction fetch address generated by the data processing apparatus, the mask logic being further operable to generate a qualifier value derived from the selected one or more bits of the mask; the remaining bits of said instruction address forming the value of the operational characteristic compared by the comparator logic with the selected value, and the comparator logic being further operable to generate an intermediate signal indicative of the comparison, the qualifier value being used to qualify the intermediate signal such that a match is only considered to occur if the qualifier value is set.

Hence, in accordance with this embodiment, in situations where variable width instruction sets are employed within the data processing apparatus, mask logic within the comparator logic can be used to generate a qualifier value based on a knowledge of the width of the instruction (as defined by the instruction set to which that instruction belongs) the subject of the instruction fetch, and the values of a predetermined number of least significant bits of the instruction fetch address. This qualifier value is then used to qualify the intermediate signal such that a match is only considered to occur if the qualifier value is set. This then allows the breakpoint generation logic to only need to generate a single breakpoint signal since the comparator logic has sufficient information to enable it to determine whether the issuance of a breakpoint signal is appropriate having regard to the instruction width, the values of the predetermined number of least significant bits, and the bits of the mask (also referred to herein as the byte lane bits).

In an alternative embodiment, where the comparator logic is arranged to generate a plurality of result signals: the instructions employed in the data processing apparatus are of variable length or width; said control storage is operable to store a mask comprising a number of bits; the comparator logic is further operable to generate an intermediate signal indicative of the comparison; the comparator logic includes mask logic operable to produce a plurality of output signals, each output signal being used in the generation of a corresponding result signal, each output signal being produced by qualifying the intermediate signal by an associated bit of the mask such that that output signal only indicates a match if the intermediate signal is set and the associated bit of the mask is set. In accordance with this embodiment, the comparator logic is not provided with any details as to the length or width of the instructions being fetched, and instead produces an output signal for each bit of the mask, these various output signals being used in the generation of corresponding result signals, and hence corresponding breakpoint signals. In one embodiment, the number of bits in the mask corresponds to the number of bytes being fetched (assuming the smallest width of all of the instruction sets is one byte), such that the breakpoint signals produced are byte-wise breakpoint signals that the processor then interprets dependent on the length and width of instructions actually being fetched. In the more general case it will be appreciated that the number of bits in the mask corresponds to the number of bytes fetched divided by the smallest width of all of the instruction sets.

In one embodiment, the operational characteristic associated with an instruction is a process identifier indicating a process associated with the instruction fetch. As discussed earlier, this enables, for example, the breakpoint logic unit to be arranged to allow the processor to run until it is not running the specified process as indicated by the selected process identifier stored in the value storage.

In one embodiment, the control storage contains a source select value identifying whether the operational characteristic is an indication of an address for the instruction fetch or is a process identifier indicating a process associated with the instruction fetch, the comparator logic being operable dependent on the source select value to compare the selected value with either the address generated by the data processing apparatus or the process identifier generated by the data processing apparatus. Hence, in accordance with this embodiment, the breakpoint logic unit is configurable for use as either an address comparator or a process identifier comparator, with breakpoint signals being generated dependent upon that comparison.

It will be appreciated that the value storage may take a variety of forms. However, in one embodiment, the value storage comprises one or more registers. Similarly, the control storage may take a variety of forms, but in one embodiment the control storage comprises one or more registers.

Viewed from a second aspect, the present invention provides debug logic for a data processing apparatus, comprising a plurality of breakpoint logic units in accordance with the first aspect of the present invention, the debug logic unit comprising combination logic operable to generate at least one breakpoint signal dependent on the breakpoint signals generated by each breakpoint logic unit.

In one embodiment, for a first breakpoint logic unit of said plurality said operational characteristic is an indication of an address for an instruction fetch, and for a second breakpoint logic unit of said plurality said operational characteristic is a process identifier indicating a process associated with the instruction fetch, for the second breakpoint unit the at least one result signal comprising a single result signal, the control storage of said second breakpoint logic unit including a link value, if the link value is set the breakpoint signal associated with the single result signal being routed as an input to said first breakpoint logic unit rather than being routed to the combination logic. Hence, in accordance with this embodiment, a control value within the control storage of the second breakpoint logic unit links the output of that second breakpoint logic unit with the first breakpoint logic unit, such that the output is routed to an input of the first breakpoint logic unit rather than being routed to the combination logic. The setting of the at least one result signal from the first breakpoint logic unit can hence be conditioned on the output from the second breakpoint logic unit.

Viewed from a third aspect, the present invention provides a method of enabling generation of a breakpoint signal in a data processing apparatus, comprising the steps of: (a) storing data indicative of a selected value for an operational characteristic of the data processing apparatus; (b) comparing within comparator logic said selected value with a value of said operational characteristic as generated by the data processing apparatus and generating at least one result signal indicative of a match between said value and said selected value; (c) storing a match control value; (d) if the match control value has a first value, setting the at least one result signal if a match is detected between said value and said selected value, whilst if the match control value has a second value setting the at least one result signal if a match is not detected between said value and said selected value; and (e) enabling generation of an associated at least one breakpoint signal if the at least one result signal is set.

Viewed from a fourth aspect, the present invention provides a method of facilitating debugging in a data processing apparatus, comprising the steps of: providing a plurality of breakpoint logic units, each said breakpoint logic unit being operable to perform the method in accordance with the third aspect of the present invention; and employing combination logic to generate at least one breakpoint signal dependent on the breakpoint signals generated by each breakpoint logic unit.

BRIEF DESCRIPTION OF THE DRAWINGS

The present invention will be described further, by way of example only, with reference to a preferred embodiment thereof as illustrated in the accompanying drawings, in which.

DESCRIPTION OF EMBODIMENT

Figure 1:
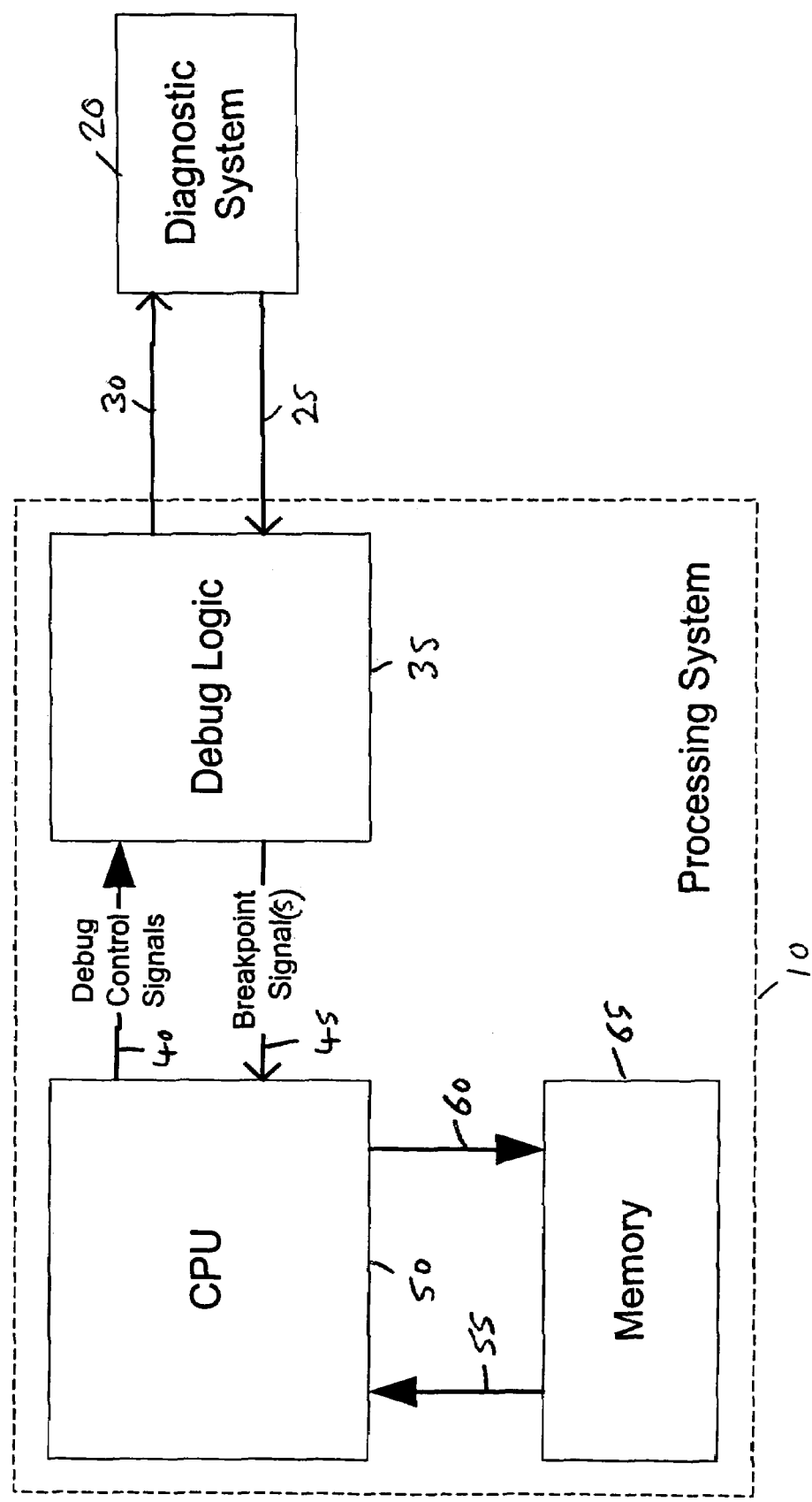
FIG. 1 is a block diagram schematically illustrating a processing system in which one or more breakpoint logic units in accordance with preferred embodiments of the present invention can be employed.
Figure 2:
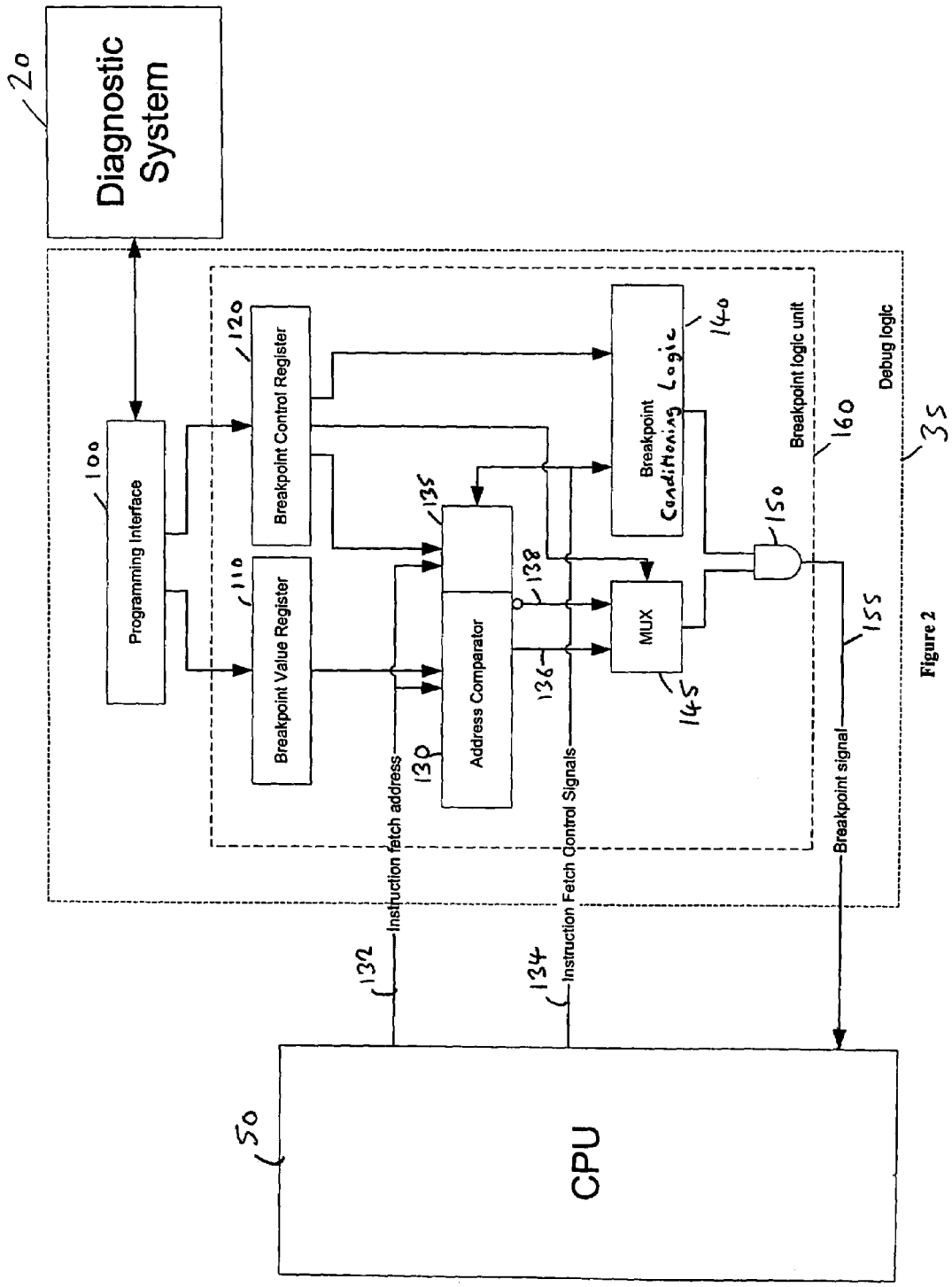
FIG. 2 is a diagram schematically illustrating in more detail the arrangement of a breakpoint logic unit in accordance with one embodiment of the present invention.

FIG. 2 illustrates the structure of a breakpoint logic unit 160 provided within the debug logic 35 in accordance with one embodiment of the present invention. In accordance with this embodiment, the breakpoint logic unit 160 includes comparator logic (consisting of an address comparator 130 and a multiplexer 145) for comparing a selected address value stored within the breakpoint value register 110 with an instruction fetch address received over path 132 from the CPU 50. The selected address value is programmed into the breakpoint value register 110 by the programming interface 100 under the control of the diagnostic system 20. As will be discussed in more detail later, the address comparator 130 may incorporate byte mask logic 135 for use in situations where variable length instructions are employed within the processing system incorporating the CPU 50. The address comparator produces an output signal over path 136 indicative of a match between the instruction fetch address and the address stored within the breakpoint value register 110, and also outputs over path 138 an inverted version of that output signal. Both the output signal and the inverted version of that output signal are routed to the multiplexer 145 which is controlled by a signal output from the breakpoint control register 120.

The contents of the breakpoint control register 120 will be discussed in more detail later with reference to FIG. 6. However, one of the control values stored within the breakpoint control register 120 is a mismatch control value, which in preferred embodiments is a one bit value used to control the selection by the multiplexer 145. In particular, if the mismatch control value is not set, then the multiplexer is arranged to output as a result signal the signal received over path 136, whereas if the mismatch control signal is set, the multiplexer is arranged to output as the result signal the signal received over path 138. It will be appreciated that it is entirely a matter of choice as to which logic value indicates a set mismatch signal. However, in one embodiment, the mismatch signal is set to a logic one value, a logic zero value indicating that the mismatch signal is not set.

Given the above-discussed operation of the multiplexer 145, it will be appreciated that the result signal output by the multiplexer will be set in either of two situations. Firstly, if the mismatch control value is not set, the result signal will be set if a match is detected between the instruction fetch address and the address in the breakpoint value register 110. Alternatively, if the mismatch control value is set, the result signal will be set if a match is not detected between the instruction fetch address and the address in the breakpoint value register 110.

In the example illustrated in FIG. 2, it is assumed that a set result signal has a logic one value, but it will be appreciated that the breakpoint logic unit 160 could be arranged such that the result signal is set with a logic zero value.

Given that in the example of FIG. 2 the result signal is set to a logic one value, it can be seen that the AND gate 150 will cause a breakpoint signal to be asserted over path 155 to the CPU 50 in the event that the result signal is set, and a logic one value is received from the breakpoint conditioning logic 140.

The breakpoint conditioning logic 140 is arranged to receive instruction fetch control signals from the CPU 50 over path 134, and also one or more further control values stored within the breakpoint control register 120. The operation of the breakpoint conditioning logic 140 will be discussed later with reference to FIG. 7, but in the event that no further conditions need to be met in order for the breakpoint signal to be issued, the breakpoint conditioning logic will be arranged to issue a logic one signal to the AND gate 150 thereby allowing a breakpoint signal 155 to be issued if the result signal from the multiplexer 145 is set.

Figure 3:
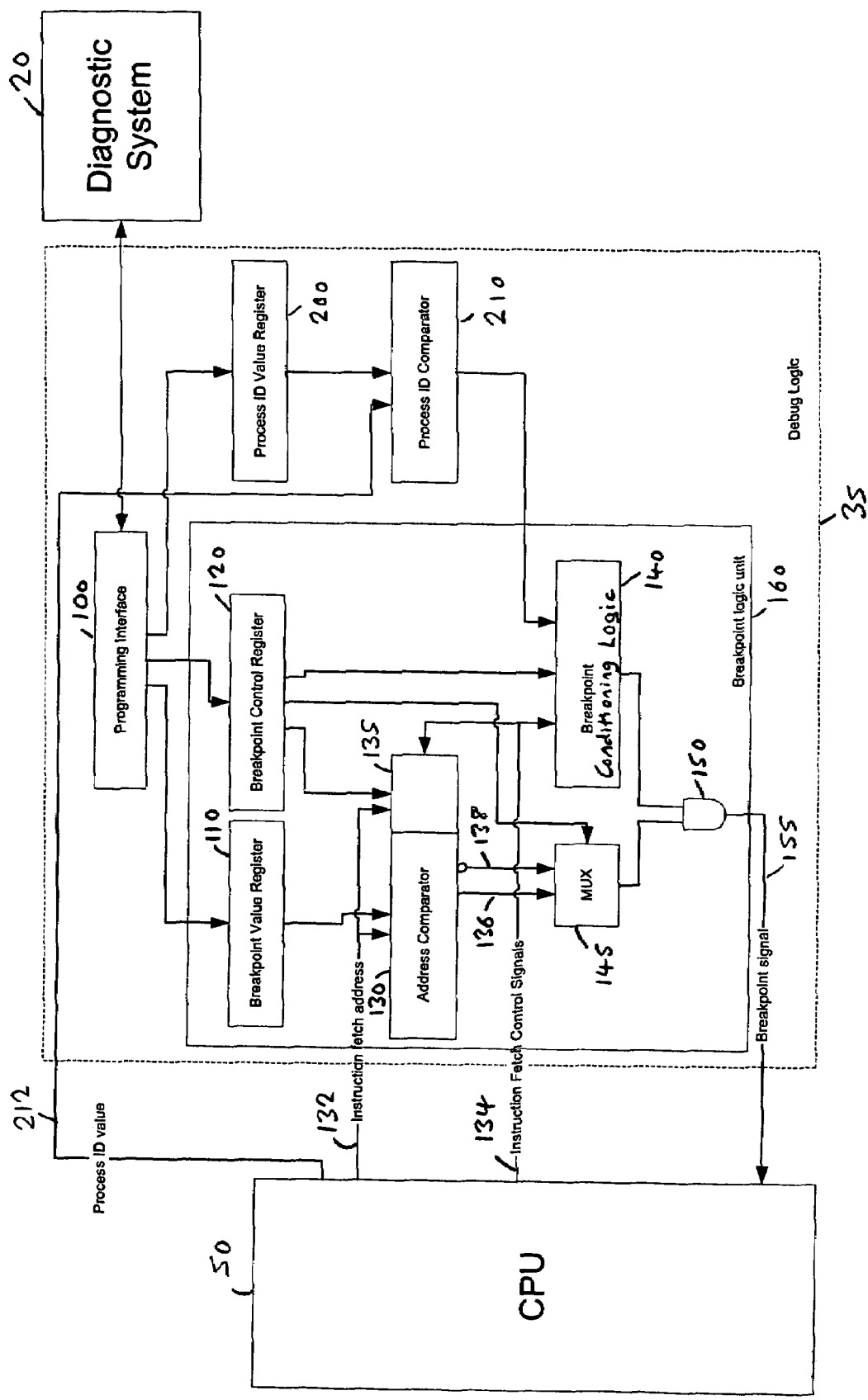
FIG. 3 is a block diagram schematically illustrating the use of the breakpoint logic unit of FIG. 2 in combination with a process identifier comparator in accordance with one embodiment of the present invention.

FIG. 3 shows an alternative embodiment of the debug logic 35, where the breakpoint logic unit 160 has the same structure as discussed earlier with reference to FIG. 2, but is incorporated within debug logic 35 that also includes process identifier logic. In particular, a process identifier value register 200 is provided for storing a process identifier value programmed by the diagnostic system 20 via the programming interface 100. This value is applied to a process identifier comparator 210 which is also arranged to receive over path 212 a process identifier value issued by the CPU 50 to provide an indication of the process issuing the instruction fetch address. The process identifier comparator 210 is arranged to generate an output signal indicative of a match between the process identifier value received over path 212 and the process identifier value stored within the process identifier value register 200, this output signal being routed as an additional input to the breakpoint conditioning logic 140. By this approach, as will be discussed later with reference to FIG. 7, it is possible to condition the generation of a breakpoint signal from the breakpoint logic unit 160 dependent on a match being detected by the process identifier comparator 210.

Figure 4:
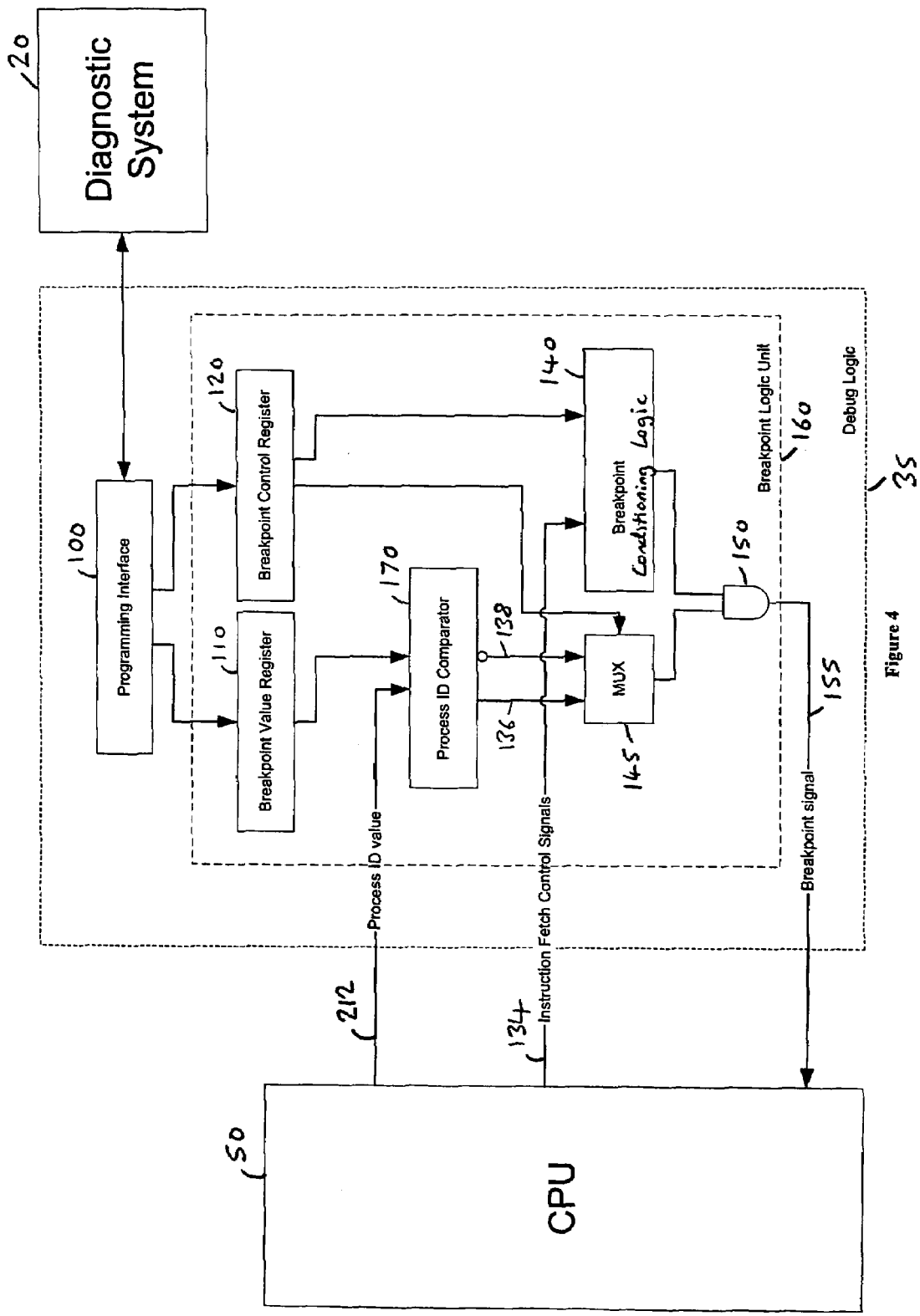
FIG. 4 is a diagram schematically illustrating a breakpoint logic unit in accordance with a further embodiment of the present invention.

FIG. 4 illustrates debug logic 35 in accordance with an alternative embodiment of the present invention, where the breakpoint logic unit 160 incorporates a process identifier comparator 170 in place of the address comparator 130. In this instance, the breakpoint value register 110 is arranged to store a selected process identifier value as programmed by the diagnostic system 20 via the programming interface 100. The two output signals passed over paths 136 and 138 from the process identifier comparator 170 to the multiplexer 145 are hence a signal indicative of a match between the process identifier value received over path 212 and the process identifier value stored within the register 110, and an inverted version of that signal. As with FIG. 2, the selection of a result signal from those two output signals by the multiplexer 145 is controlled in accordance with the value of the mismatch control value stored within the breakpoint control register 120. This enables a breakpoint signal to be generated in the event of a match of the process identifier values, or if the mismatch control signal is set to cause a breakpoint signal to be generated in the event of there not being a match between the process identifier values. As with the breakpoint logic unit 160 of FIG. 2, the breakpoint conditioning logic 140 can be used to condition the generation of the breakpoint signal 155 dependent on other conditions specified by control values in the breakpoint control register 120.

Figure 5:
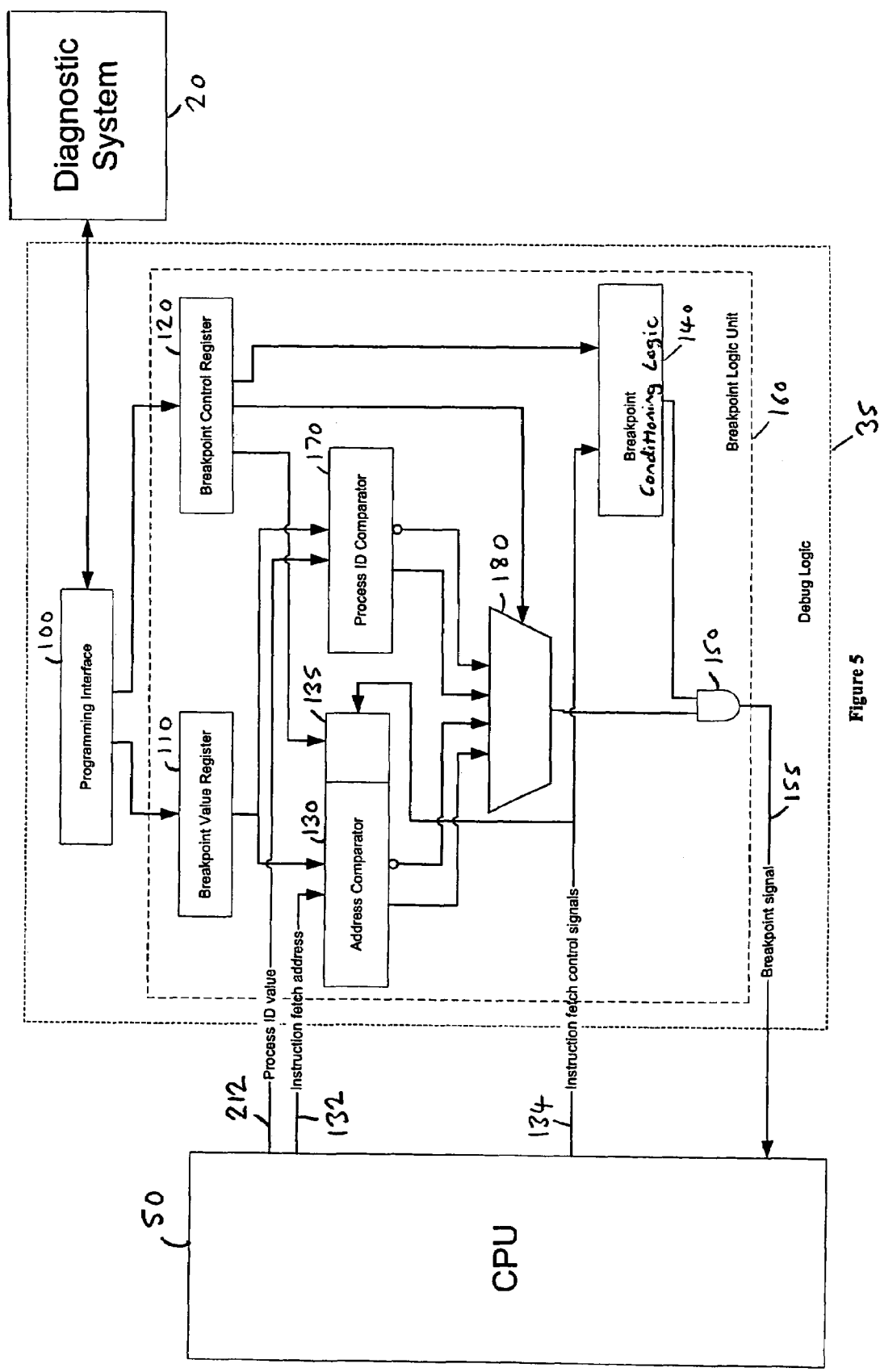
FIG. 5 is a block diagram schematically illustrating a breakpoint logic unit in accordance with a further embodiment of the present invention.

FIG. 5 illustrates an alternative embodiment of the debug logic 35 where the breakpoint logic unit 160 incorporates both an address comparator 130 and a process identifier comparator 170. In this instance, the two-way multiplexer 145 of FIGS. 2 to 4 is replaced with a four-way multiplexer 180. Within the breakpoint control register 120, a source select value will be set to indicate whether the breakpoint logic unit 160 is to perform a comparison of an instruction address or a comparison of a process identifier value, and an instruction address value/process identifier value (interpreted in accordance with the source select value) will be stored within the breakpoint value register 110. The address comparator 130 and the process identifier comparator 170 are then arranged to perform the usual comparison process based on the contents of the breakpoint value register 110 and either the instruction fetch address received over path 132 (for the address comparator 130) or the process identifier value received over path 212 (for the process identifier comparator 170). As discussed earlier with reference to FIGS. 2 and 4, both the address comparator 130 and the process identifier comparator 170 produce both an output signal and an inverted version of that output signal, such that four signals are received by the multiplexer 180.

The selection of one of the four input signals by the multiplexer 180 is controlled based on the value of the mismatch control value and the source select value stored within the breakpoint control register 120, as will be discussed in more detail later with reference to FIG. 6. As before, the result signal from the multiplexer is received by the AND gate 150, which also receives a signal from the breakpoint conditioning logic 140. A breakpoint signal will then be issued over path 155 if the result signal is set, and a logic one value is also received from the breakpoint conditioning logic 140.

Figure 6:
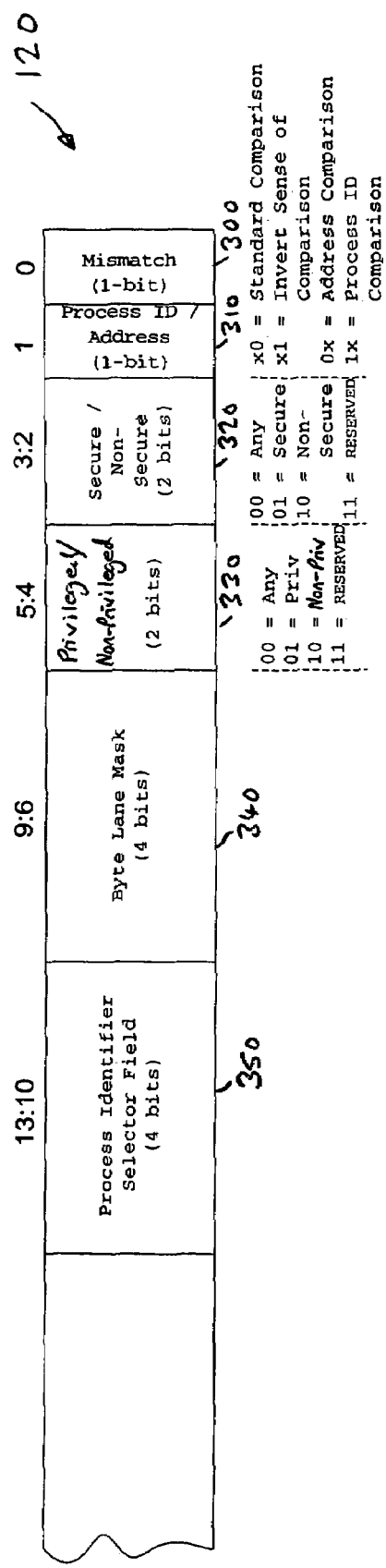
FIG. 6 is a diagram illustrating the contents of the breakpoint control register of the breakpoint logic unit in accordance with one embodiment of the present invention.

FIG. 6 is a diagram schematically illustrating certain fields provided within the breakpoint control register 120. The breakpoint control register 120 issues a number of control signals dependent on the value stored within these control fields, those values being programmed into the breakpoint control register 120 by the diagnostic system 20 using the programming interface 100.

As can be seen from FIG. 6, in this illustrative embodiment, bit zero of the control register 120 contains the mismatch control value 300, and bit one optionally contains the source select value 310. If the mismatch control value has a logic zero value, this will indicate that the comparator logic within the breakpoint logic unit 160 is to perform a standard comparison, whereas if the mismatch control signal is set (in this embodiment to a logic one value), this will indicate that the sense of the comparison should be inverted. As discussed, this value is used as an input signal to the multiplexer 145 of FIGS. 2 to 4, or the multiplexer 180 of FIG. 5. For the breakpoint logic units of FIGS. 2 to 4, the source select value provided in bit one of the breakpoint control register 120 is not relevant. However, for the example of FIG. 5, the source select value provided by bit one is used in conjunction with the mismatch control value of bit zero to determine which of the four inputs to the multiplexer 180 should be output as the result signal to the AND gate 150. As shown in FIG. 6, if the source select value has a logic zero value, this will indicate that an address comparison should be performed by the breakpoint logic unit 160, whereas if the source select value has a logic one value, this will indicate that the breakpoint logic unit 160 should perform a process identifier comparison. Hence, purely by way of illustration, if both the source select value has a logic one value and the mismatch control value has a logic one value, this will indicate to the multiplexer 180 that the inverted output from the process identifier comparator 170 should be output as the result signal to the AND gate 150.

As illustrated in FIG. 6, bits 2 and 3 of the breakpoint control register 120 contain a security domain control value which can be used to indicate the required security domain from which the instruction fetch address or process identifier value (dependent on the comparison taking place) must be generated in order for a breakpoint signal to be output. Similarly, bits 4 and 5 contain a mode control value which can be set to indicate whether the instruction fetch address or process identifier value needs to be issued from a particular mode of operation in order for a breakpoint signal to be generated.

Bits 10 to 13 of the breakpoint control register 110 contain a process identifier selector field 350, this being an optional field used for example in the debug logic 35 of FIG. 3, to identify an output from a particular process identifier comparator that should be used to condition the generation of a breakpoint signal. Field 350 need only have N bits, where $2^N-1$ is the number of process identifier comparators available for conditioning the generation of a breakpoint signal. Hence, 4 bits allows up to 15 process identifier comparators. If fewer process identifier comparators are available, fewer bits are required for field 350. Nevertheless, for compatibility between implementations it is likely that the number of bits in field 350 would be fixed. The use of the field 350 will be discussed in more detail later with reference to FIGS. 7 and 11.

The domain control value (bits 2 and 3), the mode control value (bits 4 and 5), and the process identifier selector value (bits 10 to 13) are routed from the breakpoint control register 120 to the breakpoint conditioning logic 140, and the manner in which they are processed within the breakpoint conditioning logic will be discussed later with reference to FIG. 7.

Bits 6 to 9 of the breakpoint control register 120 contain a byte lane mask value, this being an optional field that can be used in situations where variable length instructions are employed within the CPU 50. The manner in which these byte lane mask bits are used in certain embodiments will be described later with reference to FIGS. 8 and 10.

It will be appreciated that the breakpoint control register 120 may contain other fields in addition to those illustrated in FIG. 6. Further, it will be appreciated that the ordering of those fields within the breakpoint control register is purely a matter of design choice.

Figure 7:
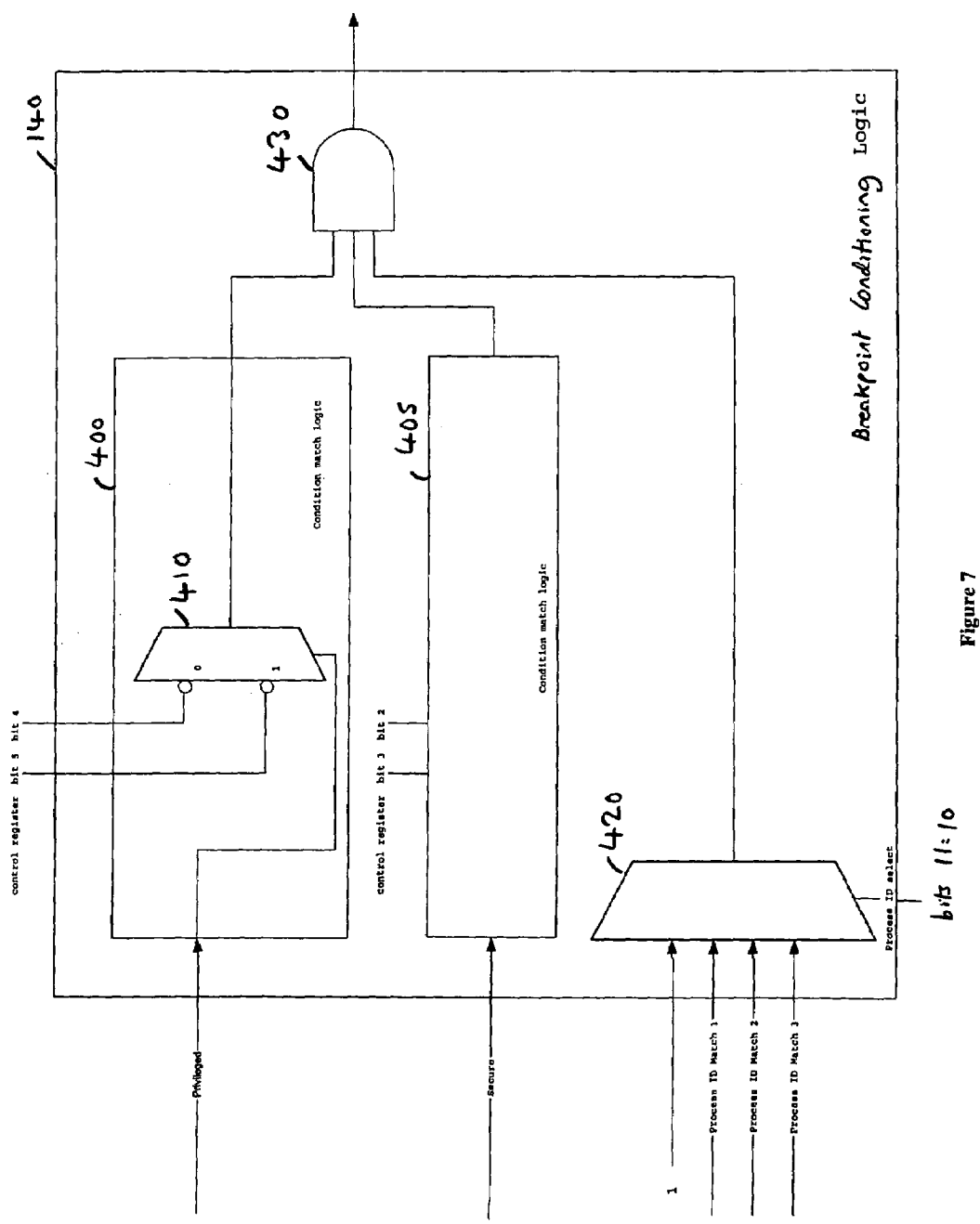
FIG. 7 is a block diagram illustrating the operations performed within the breakpoint conditioning logic of the breakpoint logic unit of one embodiment of the present invention.

FIG. 7 illustrates the operation of the breakpoint conditioning logic 140 in accordance with one embodiment of the present invention. As shown in FIG. 7, the breakpoint conditioning logic 140 includes condition match logic 400 which is arranged to receive the mode control value output from the breakpoint control register 120 (i.e. bits 4 and 5 of the control register illustrated in FIG. 6) and is also arranged to receive one of the instruction fetch control signals issued over path 134 (a mode signal) indicating whether the CPU is operating in a privileged mode of operation. Bits 4 and 5 from the control register 120 are inverted and then input to multiplexer 410, with the output from multiplexer 410 being driven in dependence on the mode signal received over path 134. As can be seen from FIG. 6, if bits 4 and 5 are both logic zero values, this indicates that no conditioning of the issuance of the breakpoint signal should be performed dependent on the mode of operation, and as can be seen from FIG. 7 this results in both inputs to the multiplexer 410 being logic one values. Accordingly, irrespective of the value of the mode signal used to select the output from the multiplexer 410, a logic one value will be output to the AND gate 430. Accordingly, in the event that the remaining logic in the breakpoint conditioning logic 140 also produces a logic one value, this will cause a logic one value to be output from the breakpoint conditioning logic 140 to the AND gate 150, thereby allowing the breakpoint signal to be issued over path 155 in the event of a set result signal from the multiplexer (element 145 in FIGS. 2, 3 and 4, element 180 in FIG. 5).

In the example illustrated in FIG. 7, it is assumed that the mode signal will be set to a logic one value if the CPU 50 is operating in a privileged mode of operation. This will cause the multiplexer 410 to output the signal it receives based on bit 5 of the control register. As can be seen from FIG. 6, bit 5 is set to a logic zero value and bit 4 is set to a logic one value if it is desired to condition the generation of a breakpoint signal on a requirement that the CPU is only operating in a privileged mode of operation. Given that these signals are then inverted prior to input to the multiplexer 410, it can hence be seen that if the privileged mode of operation does in fact exist, the multiplexer will output a logic one value to the AND gate 430, whereas if instead a non-privileged mode of operation exists, the inverted version of bit 4 will be output, which in this instance will be a logic zero value.

Similarly, it can be seen that if the mode control value is set to value "10" to indicate that a non-privileged mode of operation is required in order for the breakpoint control signal to be issued, then this will only cause a logic one value to be output from the multiplexer 410 if the mode signal received over path 134 is at logic zero level, i.e. indicating the user mode of operation.

An analogous piece of condition match logic 405 is also provided which receives bits 2 and 3 from the control register 120, i.e. the security domain control value, and is also arranged to receive a security domain signal issued by the CPU over path 134, which is set to a logic one value in the event that the CPU is operating in a secure domain. By comparison of the meanings attributed to the various values of the domain control value and the corresponding meanings given to the various values of the mode control value (see FIG. 6), it will be appreciated that the condition match logic 405 operates in the same manner as that discussed above for the condition match logic 400, and hence will not be discussed further herein.

The process identifier selector field 350 from the breakpoint control register 120 is input to the multiplexer 420 in order to control the selection of an output from that multiplexer 420. The multiplexer 420 has multiple inputs, one hard-wired to a logic one value, and the remainder receiving process identifier match signals from one or more process identifier comparators. Hence, considering the example of FIG. 3, a number of process identifier comparators 210 may be provided within the debug logic 35, the outputs from which are routed to the multiplexer 420 within the breakpoint conditioning logic 140. The process identifier selector field 350 within the breakpoint control register 120 can then be programmed to indicate which of those process identifier comparators' output, if any, is to be used to condition the generation of a breakpoint signal by the breakpoint logic unit 160. In the event that no such conditioning is required, the process identifier selector field will be set to a predetermined value which will cause the hard-wired logic one input signal to be output to the AND gate 430. Otherwise a particular process identifier comparator output will be selected for routing to the AND gate 430. By this approach, it can be seen that the generation of a breakpoint signal by the breakpoint logic unit 160 can be conditioned dependent on a particular process having issued the instruction fetch address.

Figure 8:
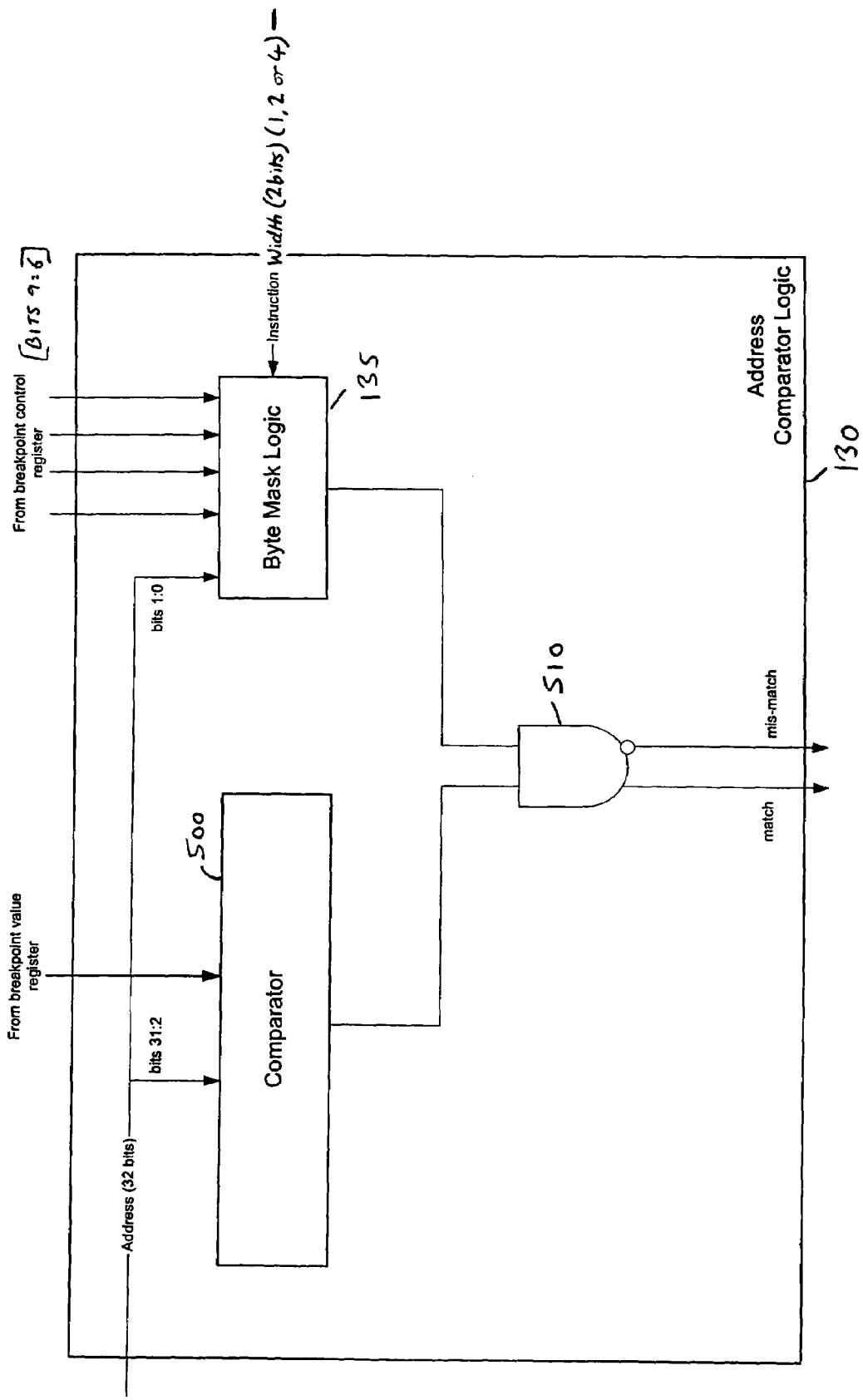
FIG. 8 is a block diagram illustrating the operation of the address comparator of FIGS. 2, 3 and 5 in situations where variable width instruction sets are used by the CPU.

FIG. 8 illustrates the operation of the address comparator logic 130 in situations where multiple width instructions are employed within the CPU 50. In this particular example, it is assumed that the instruction address is a 32-bit address irrespective of the width of the instructions themselves, and that one instruction is fetched at a time. In one particular example, the instructions referenced by the 32-bit address may be 32-bit ARM instructions, 16-bit Thumb instructions or 8-bit Java instructions. It will be appreciated that if an ARM instruction is being referenced by the address, the least significant two bits will both be zeros, if a Thumb instruction is being referenced by the address, the least significant bit will be zero, and if a Java instruction is being referenced by the instruction address, both of the two least significant bits can have any value.

Bits 31 to 2 of the instruction address are routed to comparator 500 where they are compared with the address stored within the breakpoint value register 110, with an output signal being routed to the AND gate 510 indicative of whether a match is detected. In particular, a logic one value will be output to the AND gate 510 if a match is detected, and otherwise a logic zero value will be output. Bits 1 and 0 are ignored for the purposes of the above comparison. Meanwhile, these least significant two bits are routed to byte mask logic 135, which is also arranged to receive via path 134 an instruction width value indicative of the smallest addressable unit of an instruction being referenced by the 32-bit address. The instruction width value may in one embodiment be a two-bit value having the values 0, 1 or 2, indicating a smallest addressable unit of an instruction of 1, 2 or 4 bytes, respectively. If this instruction width value has a value of zero (indicating a width of 1), this indicates that a Java instruction (i.e. an instruction consisting of one or more 8 bit values) is being referenced, if the instruction width value is one (indicating a width of two), this indicates that a Thumb instruction (i.e. an instruction consisting of one or more 16-bit values) is being referenced, and if the instruction width value is two (indicating a width of four), this indicates that an ARM instruction (i.e. a 32-bit instruction) is being referenced. The byte mask logic 135 also receives the four bits of the byte lane mask 340 stored within the breakpoint control register 120. The value of the output signal generated by the byte mask logic 135 dependent on these various input signals is illustrated below in Table 1:

TABLE 1

| Byte-lane bits | Addr[1:0] | Width[1:0] | Out |
|---|---|---|---|
| x x x 1 | 0 0 | 00 | 1 |
| x x x 0 | 0 0 | 00 | 0 |

TABLE 1-continued

| Byte-lane bits | Addr[1:0] | Width[1:0] | Out |
|---|---|---|---|
| x x 1 x | 0 1 | 00 | 1 |
| x x 0 x | 0 1 | 00 | 0 |
| x 1 x x | 1 0 | 00 | 1 |
| x 0 x x | 1 0 | 00 | 0 |
| 1 x x x | 1 1 | 00 | 1 |
| 0 x x x | 1 1 | 00 | 0 |
| x x x 1 | 0 x | 01 | 1 |
| x x 1 x | 0 x | 01 | 1 |
| x x 0 0 | 0 x | 01 | 0 |
| x 1 x x | 1 x | 01 | 1 |
| 1 x x x | 1 x | 01 | 1 |
| 0 0 x x | 1 x | 01 | 0 |
| x x x 1 | x x | 10 | 1 |
| x x 1 x | x x | 10 | 1 |
| x 1 x x | x x | 10 | 1 |
| 1 x x x | x x | 10 | 1 |
| 0 0 0 0 | x x | 10 | 0 |

(x = don't care)

It will be appreciated by those skilled in the art that there are a variety of ways in which the byte mask logic 135 could be constructed to operate in accordance with Table 1 above.

It will be appreciated from Table 1 that if the byte lane bits are set to all ones, the output signal from the byte mask logic 135 is always one regardless of the Addr[1:0] and width inputs. Further, if all byte lane bits are zero, the output signal from the byte mask logic 135 is always zero regardless of the Addr[1:0] and width inputs. In this latter case, this means that one input to AND gate 510 is always zero, and hence the match signal is always zero and the mismatch signal is always one, regardless of the output from the comparator 500. The utility of this will be discussed later.

With reference to FIG. 8, it can be seen that the AND gate 510 will output a match signal having a logic one value if both the comparator 500 detects a match, and the byte mask logic 135 outputs a logic one value, but otherwise this match signal will have a logic zero value. An inverted version of this signal is also output from the AND gate 510, this inverted version being selected by the multiplexer 145, 180 if the mismatch control signal is set.

Figure 9:
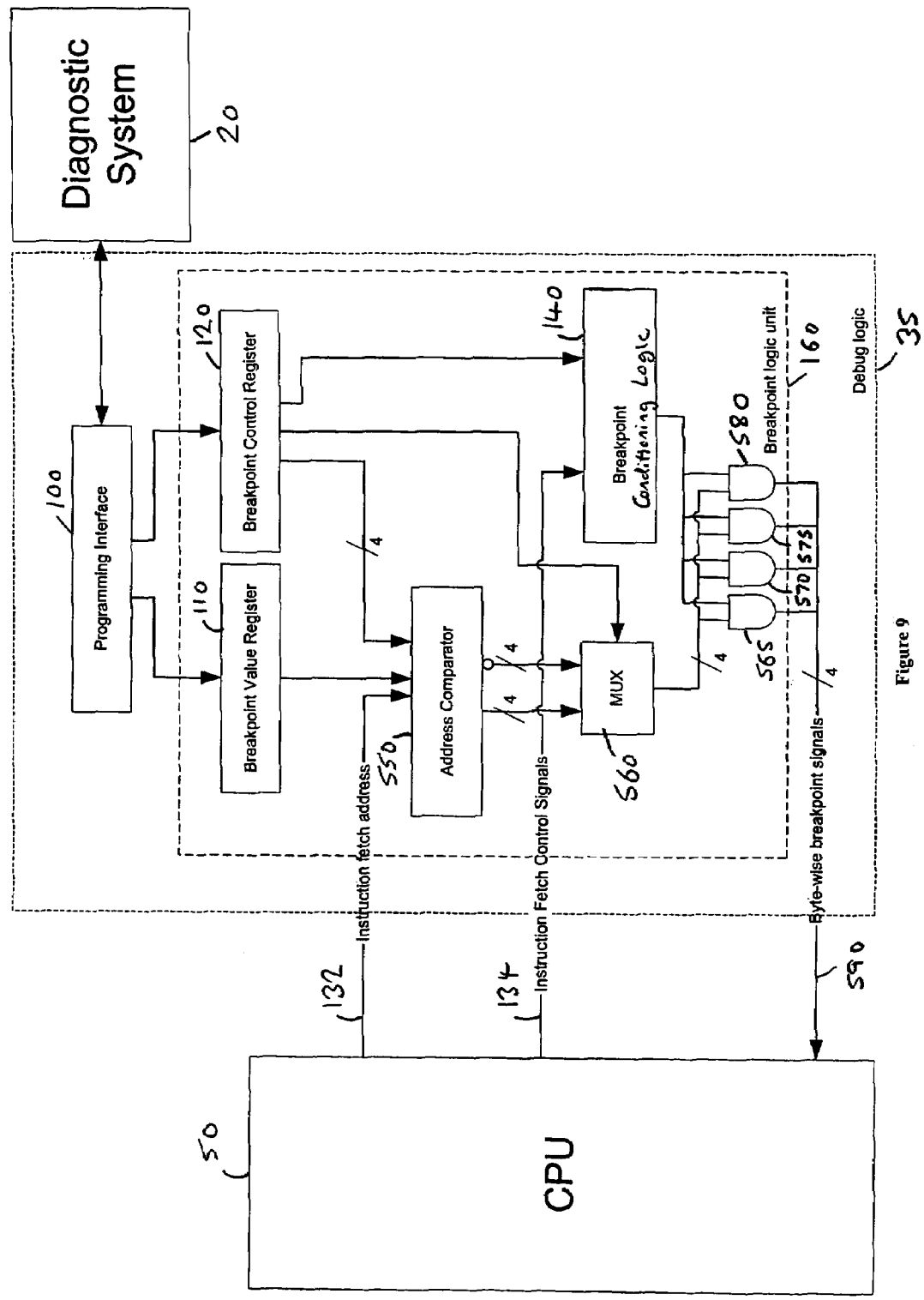
FIG. 9 is a diagram schematically illustrating a breakpoint logic unit in accordance with a further embodiment of the present invention in which multiple breakpoint signals are produced by the breakpoint logic unit.

FIG. 9 illustrates an alternative embodiment of the debug logic 35 in situations where variable length and/or width instructions are employed within the CPU 50, and a predetermined number of bytes are fetched as a result of each instruction fetch address. Hence as an example, each instruction fetch address may result in the fetching of four bytes of instruction data. This may represent one ARM instruction, up to two Thumb instructions or up to four Java instructions. In this embodiment, rather than the breakpoint logic unit 160 receiving any information about the length or width of the instruction, the breakpoint logic unit 160 is instead arranged to generate a plurality of byte-wise breakpoint signals which are issued over path 590 to the CPU 50, with CPU 50 then interpreting these breakpoint signals dependent on the length and width of instructions that are the subject of the instruction fetch.

The address comparator 550 of the breakpoint logic unit 160 of FIG. 9 is arranged to generate four output signals to the multiplexer 560 and a further four inverted versions of those signals, such that the multiplexer 560 receives eight input signals. The manner in which these signals are generated by the address comparator 550 will be discussed later with reference to FIG. 10. The mismatch control signal is then routed to the multiplexer 560 in order to determine which set of four signals are output from the multiplexer, with the selected set of four result signals then being routed to associated AND gates 565, 570, 575 and 580, each of these four AND gates also receiving the output signal from the breakpoint conditioning logic 140. Each AND gate 565, 570, 575, 580 will hence generate an associated breakpoint signal if its associated received result signal is set and a logic one value is output by the breakpoint conditioning logic 140.

Figure 10:
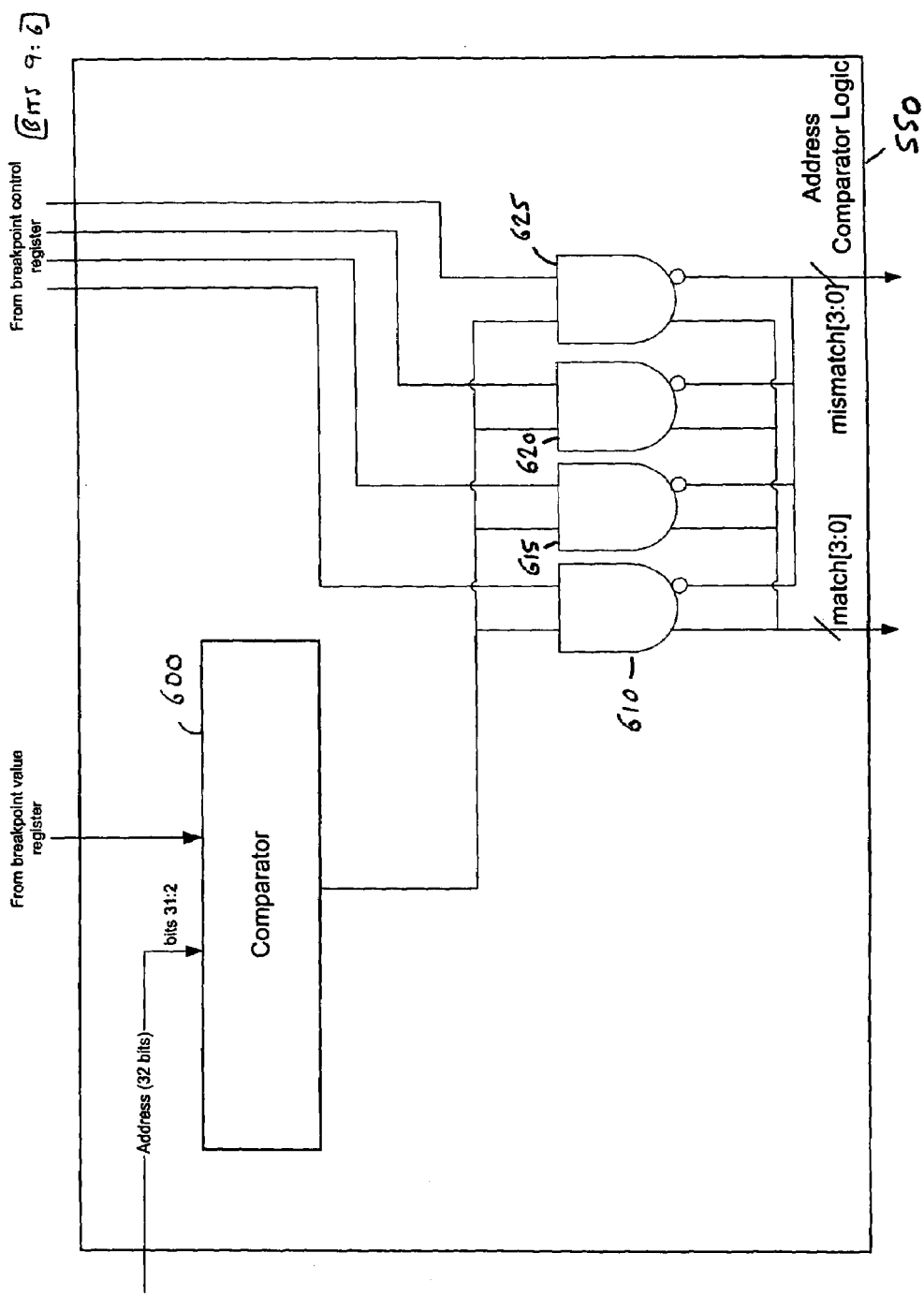
FIG. 10 is a diagram schematically illustrating the operation of the address comparator of FIG. 9.

FIG. 10 illustrates the processing performed within the address comparator 550 of FIG. 9. Within the address comparator logic 550, comparator 600 is provided which is arranged to compare bits 31 to 2 of the instruction fetch address with the value stored in the breakpoint value register 110, and to indicate an output value indicative of a match. In particular, a logic one value will be output if a match is detected, whilst otherwise a logic zero value will be output. Bits 1 and 0 are ignored. The signal from the comparator 600 is routed to each of four AND gates 610, 615, 620, 625 with each of these AND gates being arranged to receive an associated bit of the byte lane mask 340 from the breakpoint control register 120. Hence, even if a match is detected by the comparator 600, a logic one value will only be output as a match signal from the relevant AND gate 610, 615, 620, 625 if the associated bit of the byte lane mask is set to a logic one value. Hence, four separate match signals are generated at the output of the address comparator logic, along with a corresponding set of four inverted versions of those signals (referred to in FIG. 10 as mismatch signals), with these eight signals being routed to the multiplexer 560. If the mismatch control value is set, then the four mismatch values are output from the multiplexer 560, whereas otherwise the four match values are output from the multiplexer. Each of the AND gates 565, 570, 575, 580 receives a corresponding one of the signals output by the multiplexer 560.

In the embodiment described above it is assumed that the smallest addressable unit of an instruction is a byte, and hence the breakpoint signals produced are byte-wise breakpoint signals. However, in embodiments where the smallest addressable unit of an instruction is larger than a byte, there is no need for byte-wise breakpoint signals. For example, if the CPU only supports the ARM and Thumb instruction sets, there would only be a need for half-word-size (i.e. 16 bit) breakpoint signals. In such cases, FIG. 10 could be modified such that the first two bits of the byte lane mask are input to a first OR gate, and the last two bits of the byte lane mask are input to a second OR gate. The four AND gates of FIG. 10 would then be replaced by just two AND gates, each of which receives the output from a corresponding one of the OR gates. In this example byte lanes are still included in the byte lane mask for compatibility, but in an alternative embodiment the "odd" bits of the byte lane mask could be ignored to effectively provide just two half-word mask bits. These two half word mask bits could then be input directly to the two AND gates without the need for the two OR gates mentioned above.

Figure 11:
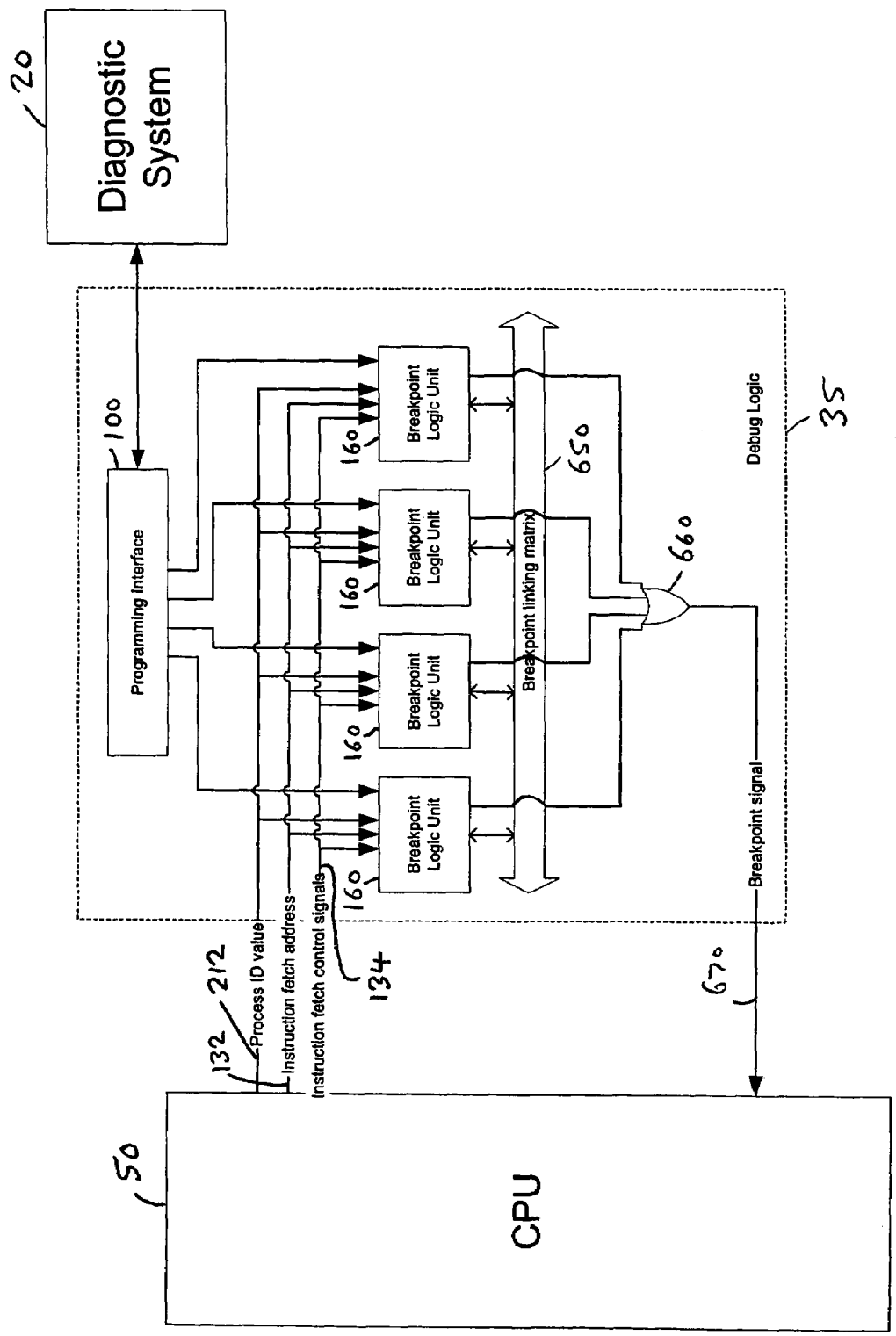
FIG. 11 is a diagram of an embodiment of the present invention in which multiple breakpoint logic units are provided within the debug logic.

FIG. 11 illustrates one embodiment of the present invention where multiple breakpoint logic units 160 are provided within the debug logic 35. Each breakpoint logic unit may be arranged as discussed earlier with reference to FIG. 5, and so can be arranged to operate as either an address comparator or a process identifier comparator. Alternatively, some of the breakpoint logic units may take the form discussed earlier with reference to FIG. 2 (i.e. address comparators), others may take the form discussed earlier with reference to FIG. 4 (i.e. process identifier comparators), and others may take the form discussed earlier with reference to FIG. 5 (either an address comparator or a process identifier comparator).

The diagnostic system 20 can, via the programming interface 100, set up required values in the breakpoint value register 110 and breakpoint control register 120 of each breakpoint logic unit.

Breakpoint signals from each breakpoint logic unit 160 are routed to the breakpoint linking matrix 650. In one embodiment, the control register 120 of each breakpoint logic unit 160 contains an enable bit that is ANDed with the breakpoint signal independently of the operation performed by the conditioning logic 140. More particularly, the output from AND gate 150 of each breakpoint logic unit is ANDed with the associated enable signal to generate a signal that is routed to OR gate 660 used to generate an output breakpoint signal over path 670 in dependence upon the signals received by it. Further, the raw output signal from the AND gate 150 of each breakpoint logic unit is output directly into the matrix 650.

In addition, where a process identifier comparator has its output "linked" to an address comparator, the breakpoint linking matrix will route the breakpoint signal from that process identifier comparator as an input to the breakpoint conditioning logic 140 of the identified address comparator. In this instance, the breakpoint signal from the process identifier comparator is not routed to the OR gate 660.

It will be appreciated that through use of the above described embodiments of the present invention, a great deal of flexibility is provided with regard to the setting of conditions for issuing breakpoint signals. A non-exhaustive illustration of the ways in which such embodiments can be used is as follows:

(a) Use of a Mismatch Signal for Single-stepping

The mismatch control value added to the control register 120 enables the sense of the comparison performed on the instruction address put out by the processor and that stored in the value register to be inverted. When this control signal is set, the breakpoint signal is asserted into the processor when the address of the instruction fetched does not match that stored in the value register 110.

This single mismatch control value therefore allows single-stepping to be implemented. In order to single-step, the address of the instruction being "stepped from" is programmed into the value register 110, and the "mismatch" control bit is set. The processor will then load the first instruction. As the address of this instruction matches that in the value register, no breakpoint signal is driven into the core. The processor then fetches subsequent instructions. As the addresses of each of these instructions do not match the address in the value register, the breakpoint signal is driven into the processor. Therefore the processor stops execution on the next instruction to be executed after the instruction being stepped from is executed.

(b) Combining the Mismatch Signal with Other Control Signals to Generate Complex Single-step Controls This mismatch control value can be used as one of a plurality of control values that control the behaviour of breakpoint signals. All these control values must be satisfied before the breakpoint signal is signalled by the processor.

For example, a second control value controls whether a breakpoint is signalled by the processor if the processor is running in a privileged mode.

If the code being debugged is not privileged code it is being run in a non-privileged mode. Exceptions are always handled in privileged mode, and once handled the exception handler returns to the non-privileged program. By setting this second control value to a first value and setting the "mismatch" control value, the diagnostic system can guarantee that the single-step will step only to the next instruction of the non-privileged mode. This allows for the situation where, if the instruction causes an exception, or an exception otherwise occurs, the processor does not halt until the exception is handled, rather than single stepping into the exception handler, which is the behaviour of other single-stepping schemes.

A further control value "links" the breakpoint to a process identifier comparator. The breakpoint signal is signalled by the processor when the process identifier comparator matches that of the current process identifier programmed in a control value register by the control software running on the processor. By setting this control value and the "mismatch" control value, a diagnostic system can guarantee that the single-step will step only to the next instruction of the current process.

A further control value controls whether a breakpoint is signalled by the processor if the processor is running in a secure state, or whether the breakpoint is signalled by the processor if the processor is running in a non-secure state. By appropriate setting of this control value and the "mismatch" control value, a diagnostic system can guarantee that the single-step will step only to the next secure/non-secure instruction.

(c) Combining with a "Match Nowhere" Breakpoint to Create a "Match Anywhere" Breakpoint for Complex "Run To" Controls A simple address comparator, as may be used in (a) and (b) above, consists of a 32-bit value that is compared directly with the 32-bit address of the instruction issued by the processor. A breakpoint is signalled if the 32-bit values are the same.

The particular kind of address comparator described in FIGS. 8 and 10 allows a single breakpoint to match on multiple similar addresses. By setting the byte-lane mask to all zeros, no address can signal a breakpoint. By then applying the "mismatch" control value, this generates a setting where all addresses generate breakpoints. Therefore the processor will halt execution on any instruction executed regardless of the address. When used by itself, this allows a diagnostic system to halt execution of the processor. When used in conjunction with the other breakpoint control values described above, this allows the following breakpoint scenarios to be established:

Halt when the processor enters a privileged mode/halt when the processor enters a non-privileged mode.

Halt when the processor starts executing code from a particular process.

Halt when the processor enters secure state/halt when the processor enters a non-secure state.

(d) Using Mismatch Control with Process ID Comparisons

Mentioned above was a process ID comparator (refer to description of FIGS. 3, 4, 5, 6 and 7). This operates by comparing a unique 32-bit identifier held in a debug value register with a 32-bit value programmed into a control register by the system software running on the processor when it changes the program being executed.

The process ID comparators can also act in isolation to signal breakpoints to the core, such that the processor will halt execution whenever the processor has the matching 32-bit identifier programmed in the control register, and when other control values allow the breakpoint to be signalled. The mismatch control value can be applied also to this comparator, allowing the following breakpointing scenarios to be established:

Run until the processor is not running the specified process

Run until the processor is not running the specified process and is in a privileged mode/Run until the processor is not running the specified process and is in a non-privileged mode Run until the processor is not running the specified process and is in secure state/Run until the processor is not running the specified process and is in a non-secure state It will be appreciated that the examples mentioned in points (b) to (d) above are not intended to be exhaustive, and other combinations are envisaged.

It will further be appreciated that the above embodiments of the present invention may be used in situations where either a Harvard architecture (i.e. separate instruction memories and data memories) or a Von Neumann architecture (i.e. a unified memory structure for storing instruction and data) is used in the processing system 10. In situations where a Von Neumann architecture is used, the instruction fetch control signals passed over path 134 will include an additional control signal indicating whether the address relates to an instruction address or a data address.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A breakpoint logic unit for a data processing apparatus, comprising:

a value storage configured to store data indicative of a selected value for an operational characteristic of the data processing apparatus;

comparator logic configured to compare said selected value with a value of said operational characteristic as generated by the data processing apparatus and to generate at least one result signal indicative of a match between said value and said selected value;

a control storage configured to store a match control value, if the match control value has a first value the comparator logic being operable to set the at least one result signal if a match is detected between said value and said selected value, while if the match control value has a second value the comparator logic being operable to set the at least one result signal if a match is not detected between said value and said selected value; and breakpoint generation logic configured to enable generation of an associated at least one breakpoint signal if the at least one result signal is set;

wherein the at least one result signal comprises a single result signal, and the breakpoint generation logic is configured to enable generation of an associated single breakpoint signal if the result signal is set;

wherein said operational characteristic is an indication of an instruction fetch address, and wherein:

the instructions employed in the data processing apparatus are of variable width;

said control storage is configured to store a mask comprising a number of bits;

the comparator logic includes mask logic configured to receive a width control signal indicative of the width of the instruction the subject of the instruction fetch, and to select one or more bits of the mask dependent on the value of the width control signal and a predetermined number of least significant bits of the instruction fetch address generated by the data processing apparatus, the mask logic being further operable to generate a qualifier value derived from the selected one or more bits of the mask;

the remaining bits of said instruction address forming the value of the operational characteristic compared by the comparator logic with the selected value, and the comparator logic being further configured to generate an intermediate signal indicative of the comparison, the qualifier value being used to qualify the intermediate signal such that a match is only considered to occur if the qualifier value is set.

2. A breakpoint logic unit as claimed in claim 1, wherein the match control signal is a mismatch control signal, such that if the mismatch control signal is not set the comparator logic is operable to set the at least one result signal if a match is detected between said value and said selected value, while if the mismatch control signal is set the comparator logic is operable to set the at least one result signal if a match is not detected between said value and said selected value.

3. A breakpoint logic unit as claimed in claim 1, wherein, for each said result signal, the breakpoint generation logic is operable to generate the associated breakpoint signal if that result signal is set.

4. A breakpoint logic unit as claimed in claim 1, wherein said control storage is operable to store one or more further control values identifying one or more required conditions to be met in order for the at least one breakpoint signal to be generated, and the breakpoint logic unit further comprises:

breakpoint conditioning logic operable to receive control signals generated by the data processing apparatus and associated with the value of said operational characteristic and to determine based on the received control signals whether said one or more required conditions are met;

the breakpoint generation logic being operable, for each said result signal, to generate the associated breakpoint signal if both that result signal is set and said one or more required conditions are met.

5. A breakpoint logic unit as claimed in claim 4, wherein said one or more further control values comprise a mode control value indicating a required mode of operation from which the value of said operational characteristic was generated in order for the at least one breakpoint signal to be generated.

6. A breakpoint logic unit as claimed in claim 4, wherein said one or more further control values comprise a domain control value indicating a required domain from which the value of said operational characteristic was generated in order for the at least one breakpoint signal to be generated.

7. A breakpoint logic unit as claimed in claim 4, wherein said one or more further control values comprise an indication of one or more required processes from which the value of said operational characteristic was generated in order for the at least one breakpoint signal to be generated, the breakpoint conditioning logic being operable to receive one or more process match signals from one or more process identifier comparators indicative of whether the value of said operational characteristic was generated from one of said one or more required processes.

8. A breakpoint logic unit as claimed in claim 1, wherein the value storage comprises one or more registers.

9. A breakpoint logic unit as claimed in claim 1, wherein the control storage comprises one or more registers.

10. Debug logic for a data processing apparatus, comprising a plurality of breakpoint logic units as claimed in claim 1, the debug logic unit comprising combination logic configured to generate at least one breakpoint signal dependent on the breakpoint signals generated by each breakpoint logic unit.

11. Debug logic as claimed in claim 10, further comprising an additional breakpoint logic unit including:
a value storage configured to store data indicative of a selected value for an operational characteristic of the data processing apparatus;
comparator logic configured to compare said selected value with a value of said operational characteristic as generated by the data processing apparatus and to generate at least one result signal indicative of a match between said value and said selected value;
a control storage configured to store a match control value, if the match control value has a first value the comparator logic being operable to set the at least one result signal if a match is detected between said value and said selected value, while if the match control value has a second value the comparator logic being operable to set the at least one result signal if a match is not detected between said value and said selected value; and
breakpoint generation logic configured to enable generation of an associated at least one breakpoint signal if the at least one result signal is set;
wherein said operational characteristic is a process identifier indicating a process associated with an instruction fetch performed by the data processing apparatus, and wherein the at least one result signal comprises a single result signal, and the breakpoint generation logic is configured to enable generation of an associated single breakpoint signal if the result signal is set,
for the additional breakpoint logic unit, the at least one result signal comprising a single result signal, the control storage of said additional breakpoint logic unit including a link value, if the link value is sets the breakpoint signal associated with the single result signal being routed as an input to a first breakpoint logic unit of said plurality rather than being routed to the combination logic.

12. A method of enabling generation of a breakpoint signal in a data processing apparatus, comprising:
(a) storing data indicative of a selected value for an operational characteristic of the data processing apparatus;
(b) comparing within comparator logic said selected value with a value of said operational characteristic as generated by the data processing apparatus and generating at least one result signal indicative of a match between said value and said selected value;
(c) storing a match control value;
(d) if the match control value has a first value, setting the at least one result signal if a match is detected between said value and said selected value, while if the match control value has a second value setting the at least one result signal if a match is not detected between said value and said selected value; and
(e) enabling generation of an associated at least one breakpoint signal if the at least one result signal is set;
wherein the at least one result signal comprises a single result signal, and said step (e) enabling generation of an associated single breakpoint signal if the result signal is set;
wherein said operational characteristic is an indication of an instruction fetch address and wherein the instructions employed in the data processing apparatus are of variable width, and the method further comprising:
storing a mask comprising a number of bits;
employing mask logic within the comparator logic to receive a width control signal indicative of the width of the instruction the subject of the instruction fetch, and to select one or more bits of the mask dependent on the value of the width control signal and a predetermined number of least significant bits of the instruction fetch address generated by the data processing apparatus, the mask logic generating a qualifier value derived from the selected one or more bits of the mask;
at said step (b) using the remaining bits of said instruction address as the value of the operational characteristic compared with the selected value; and
generating an intermediate signal indicative of the comparison, the qualifier value being used to qualify the intermediate signal such that a match is only considered to occur if the qualifier value is set.

13. A method as claimed in claim 12, wherein the match control signal is a mismatch control signal, such that if the mismatch control signal is not set the at least one result signal is set at said step (d) if a match is detected between said value and said selected value, while if the mismatch control signal is set the at least one result signal is set at said step (d) if a match is not detected between said value and said selected value.

14. A method as claimed in claim 12, wherein, for each said result signal, the associated breakpoint signal is generated at said step (e) if that result signal is set.

15. A method as claimed in claim 12, further comprising:
storing one or more further control values identifying one or more required conditions to be met in order for the at least one breakpoint signal to be generated;
receiving at breakpoint conditioning logic control signals generated by the data processing apparatus and associated with the value of said operational characteristic and determining based on the received control signals whether said one or more required conditions are met;
for each said result signal, the associated breakpoint signal being generated at said step (e) if both that result signal is set and said one or more required conditions are met.

16. A method as claimed in claim 15, wherein said one or more further control values comprise a mode control value indicating a required mode of operation from which the value of said operational characteristic was generated in order for the at least one breakpoint signal to be generated.

17. A method as claimed in claim 15, wherein said one or more further control values comprise a domain control value indicating a required domain from which the value of said operational characteristic was generated in order for the at least one breakpoint signal to be generated.

18. A method as claimed in claim 15, wherein said one or more further control values comprise an indication of one or more required processes from which the value of said operational characteristic was generated in order for the at least one breakpoint signal to be generated, the breakpoint conditioning logic receiving one or more process match signals from one or more process identifier comparators indicative of whether the value of said operational characteristic was generated from one of said one or more required processes.

19. A method of facilitating debugging in a data processing apparatus, comprising:

providing a plurality of breakpoint logic units, each said breakpoint logic unit being operable to perform the method as claimed in claim 12; and employing combination logic to generate at least one breakpoint signal dependent on the breakpoint signals generated by each breakpoint logic unit.

20. A method as claimed in claim 19, further comprising providing an additional breakpoint logic unit operable to perform the following method:

(a) storing data indicative of a selected value for an operational characteristic of the data processing apparatus;

(b) comparing within comparator logic said selected value with a value of said operational characteristic as generated by the data processing apparatus and generating at least one result signal indicative of a match between said value and said selected value;

(c) storing a match control value;

(d) if the match control value has a first value, setting the at least one result signal if a match is detected between said value and said selected value, while if the match control value has a second value setting the at least one result signal if a match is not detected between said value and said selected value; and (e) enabling generation of an associated at least one breakpoint signal if the at least one result signal is set;

wherein said operational characteristic is a process identifier indicating a process associated with an instruction fetch performed by the data processing apparatus, and wherein the at least one result signal comprises a single result signal, and said step (e) enabling generation of an associated single breakpoint signal if the result signal is set, for the additional breakpoint logic units the at least one result signal comprising a single result signal, said additional breakpoint logic unit having a link value associated therewith, if the link value is set, the breakpoint signal associated with the single result signal being routed as an input to a first breakpoint logic unit of said plurality rather than being routed to the combination logic.

21. A method of enabling generation of a breakpoint signal in a data processing apparatus, comprising:

(a) storing data indicative of a selected value for an operational characteristic of the data processing apparatus;

(b) comparing within comparator logic said selected value with a value of said operational characteristic as generated by the data processing apparatus and generating at least one result signal indicative of a match between said value and said selected value;

(c) storing a match control value;

(d) if the match control value has a first value, setting the at least one result signal if a match is detected between said value and said selected value, while if the match control value has a second value setting the at least one result signal if a match is not detected between said value and said selected value; and (e) enabling generation of an associated at least one breakpoint signal if the at least one result signal is set;

wherein the at least one result signal comprises a plurality of result signals, and for each said result signal said step (e) enables generation of an associated breakpoint signal if that result signal is set;

wherein said operational characteristic is an indication of an instruction fetch address and wherein the instructions employed in the data processing apparatus are of variable length or width, and the method further comprising:

storing a mask comprising a number of bits;

at said step (b) generating an intermediate signal indicative of the comparison;

employing mask logic within the comparator logic to produce a plurality of output signals, each output signal being used in the generation of a corresponding result signal, each output signal being produced by qualifying the intermediate signal by an associated bit of the mask such that that output signal only indicates a match if the intermediate signal is set and the associated bit of the mask is set.

22. A method as claimed in claim 21, wherein the match control signal is a mismatch control signal, such that if the mismatch control signal is not set, the at least one result signal is set at said step (d) if a match is detected between said value and said selected value, while if the mismatch control signal is set, the at least one result signal is set at said step (d) if a match is not detected between said value and said selected value.

23. A method as claimed in claim 21, wherein, for each said result signal, the associated breakpoint signal is generated at said step (e) if that result signal is set.

24. A method as claimed in claim 21, further comprising:

storing one or more further control values identifying one or more required conditions to be met in order for the at least one breakpoint signal to be generated;

receiving at breakpoint conditioning logic control signals generated by the data processing apparatus and associated with the value of said operational characteristic and determining based on the received control signals whether said one or more required conditions are met;

for each said result signal, the associated breakpoint signal being generated at said step (e) if both that result signal is set and said one or more required conditions are met.

25. A method as claimed in claim 24, wherein said one or more further control values comprise a mode control value indicating a required mode of operation from which the value of said operational characteristic was generated in order for the at least one breakpoint signal to be generated.

26. A method as claimed in claim 24, wherein said one or more further control values comprise a domain control value indicating a required domain from which the value of said operational characteristic was generated in order for the at least one breakpoint signal to be generated.

27. A method as claimed in claim 24, wherein said one or more further control values comprise an indication of one or more required processes from which the value of said operational characteristic was generated in order for the at least one breakpoint signal to be generated, the breakpoint conditioning logic receiving one or more process match signals from one or more process identifier comparators indicative of whether the value of said operational characteristic was generated from one of said one or more required processes.

28. A breakpoint logic unit for a data processing apparatus, comprising:

a value storage operable to store data indicative of a selected value for an operational characteristic of the data processing apparatus;

comparator logic configured to compare said selected value with a value of said operational characteristic as generated by the data processing apparatus and to generate at least one result signal indicative of a match between said value and said selected value;

a control storage configured to store a match control value, if the match control value has a first value the comparator logic being operable to set the at least one result signal if a match is detected between said value and said selected value, while if the match control value has a second value the comparator logic being operable to set the at least one result signal if a match is not detected between said value and said selected value; and breakpoint generation logic configured to enable generation of an associated at least one breakpoint signal if the at least one result signal is set;

wherein the at least one result signal comprises a plurality of result signals, and for each said result signal the breakpoint generation logic is configured to enable generation of an associated breakpoint signal if that result signal is set;

wherein said operational characteristic is an indication of an instruction fetch address, and wherein:

the instructions employed in the data processing apparatus are of variable length or width;

said control storage is configured to store a mask comprising a number of bits;

the comparator logic is further configured to generate an intermediate signal indicative of the comparison;

the comparator logic includes mask logic configured to produce a plurality of output signals, each output signal being used in the generation of a corresponding result signal, each output signal being produced by qualifying the intermediate signal by an associated bit of the mask such that that output signal only indicates a match if the intermediate signal is set and the associated bit of the mask is set.

29. A breakpoint logic unit as claimed in claim 28, wherein the match control signal is a mismatch control signal, such that if the mismatch control signal is not set the comparator logic is configured to set the at least one result signal if a match is detected between said value and said selected value, while if the mismatch control signal is set the comparator logic is configured to set the at least one result signal if a match is not detected between said value and said selected value.

30. A breakpoint logic unit as claimed in claim 28, wherein, for each said result signal, the breakpoint generation logic is configured to generate the associated breakpoint signal if that result signal is set.

31. A breakpoint logic unit as claimed in claim 28, wherein said control storage is configured to store one or more further control values identifying one or more required conditions to be met in order for the at least one breakpoint signal to be generated, and the breakpoint logic unit further comprising:

breakpoint conditioning logic configured to receive control signals generated by the data processing apparatus and associated with the value of said operational characteristic and to determine based on the received control signals whether said one or more required condition are met:

the breakpoint generation logic being configured, for each said result signal, to generate the associated breakpoint signal if both that result signal is set and said one or more required conditions are met.

32. A breakpoint logic unit as claimed in claim 31, wherein said one or more further control values comprise a mode control value indicating a required mode of operation from which the value of said operational characteristic was generated in order for the at least one breakpoint signal to be generated.

33. A breakpoint logic unit as claimed in claim 31, wherein said one or more further control values comprise a domain control value indicating a required domain from which the value of said operational characteristic was generated in order for the at least one breakpoint signal to be generated.

34. A breakpoint logic unit as claimed in claim 31, wherein said one or more further control values comprise an indication of one or more required processes from which the value of said operational characteristic was generated in order for the at least one breakpoint signal to be generated, the breakpoint conditioning logic being configured to receive one or more process match signals from one or more process identifier comparators indicative of whether the value of said operational characteristic was generated from one of said one or more required processes.

* * * * *